(12) United States Patent
Tonami et al.

(10) Patent No.: US 9,507,031 B2
(45) Date of Patent: Nov. 29, 2016

(54) RADIATION DETECTOR AND TOMOGRAPHIC EQUIPMENT PROVIDED WITH THE SAME

(75) Inventors: Hiromichi Tonami, Kyoto-fu (JP); Tomoaki Tsuda, Kyoto (JP); Junichi Ohi, Muko (JP)

(73) Assignee: SHIMADZU CORPORATION, Kyoto (JP)

( * ) Notice: Subject to any disclaimer, the term of this patent is extended or adjusted under 35 U.S.C. 154(b) by 1543 days.

(21) Appl. No.: 12/865,498

(22) PCT Filed: Oct. 16, 2008

(86) PCT No.: PCT/JP2008/068783
§ 371 (c)(1),
(2), (4) Date: Jul. 30, 2010

(87) PCT Pub. No.: WO2009/101730
PCT Pub. Date: Aug. 20, 2009

(65) Prior Publication Data
US 2010/0320389 A1     Dec. 23, 2010

(30) Foreign Application Priority Data
Feb. 13, 2008 (WO) .................. PCT/JP2008/052346

(51) Int. Cl.
*G01T 1/10* (2006.01)
*G01T 1/164* (2006.01)

(52) U.S. Cl.
CPC .................. *G01T 1/1644* (2013.01)

(58) Field of Classification Search
USPC ................ 250/331, 336.1, 370.11, 390.11, 250/339.06, 339.11
See application file for complete search history.

(56) References Cited

U.S. PATENT DOCUMENTS

| | | | |
|---|---|---|---|
| 6,298,113 B1* | 10/2001 | Duclos et al. ................... | 378/19 |
| 6,965,661 B2* | 11/2005 | Kojima et al. ................... | 378/4 |
| 2002/0191734 A1 | 12/2002 | Kojima et al. | |
| 2004/0178347 A1 | 9/2004 | Murayama et al. | |
| 2007/0262261 A1 | 11/2007 | Liang | |
| 2009/0072157 A1 | 3/2009 | Tonami | |

FOREIGN PATENT DOCUMENTS

| | | |
|---|---|---|
| CN | 1391870 A | 1/2003 |
| JP | 2004-279057 A | 10/2004 |
| WO | WO-2007/141831 A1 | 12/2007 |

OTHER PUBLICATIONS

Tsuda et al. "A Four-Layer Depth of Interaction Detector Block for Small Animal PET" Oct. 2004.*

(Continued)

*Primary Examiner* — Rafferty Kelly
(74) *Attorney, Agent, or Firm* — Cheng Law Group, PLLC

(57) ABSTRACT

A radiation detector according to this invention has a first reflector frame and a second reflector frame. Each of scintillation counter crystals is inserted in a direction through the first reflector frame and the second reflector frame, whereby two or more scintillation counter crystals are arranged in a first direction and a second direction to form a scintillation counter crystal layer. A position of the first reflector frame provided, in the scintillation counter crystal layer differs from a position of the second reflector frame provided in the scintillation counter crystal layer. With such construction, the radiation detector may be provided of significantly suppressed manufacturing costs without reducing spatial resolution and detecting sensitivity.

13 Claims, 13 Drawing Sheets

(56) References Cited

OTHER PUBLICATIONS

The First Office Action for the Application No. 200880125568.9 from the People's Republic of China dated May 31, 2012.

International Search Report for the Application No. PCT/JP2008/088783 mailed Nov. 11, 2008.

Supplementary Partial European Search Report for the Application No. EP 08 87 2336 dated May 8, 2014.

* cited by examiner

Fig.6
(a)
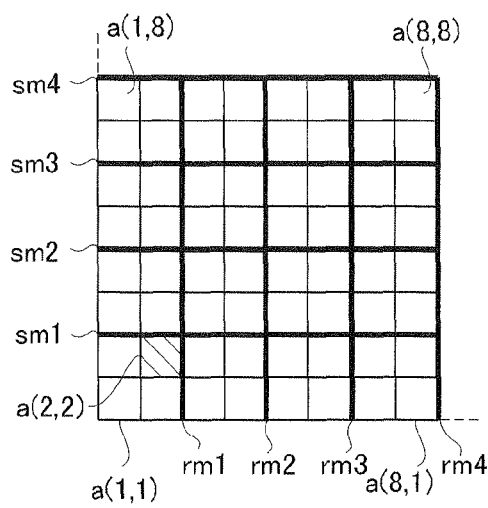
(b)
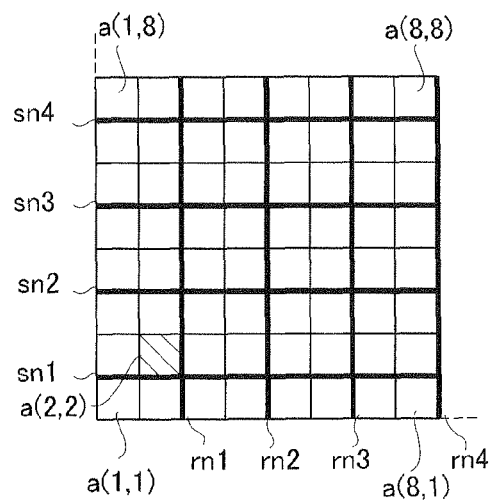
(c)
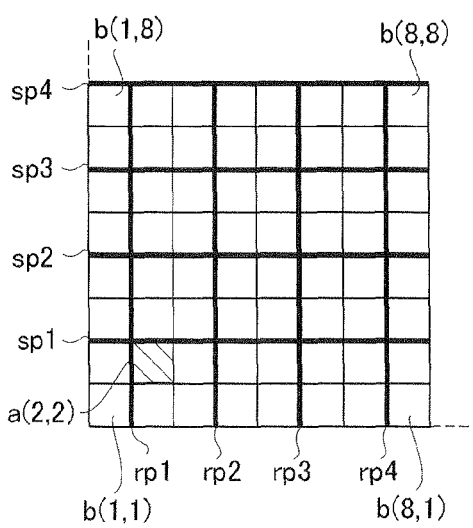
(d)
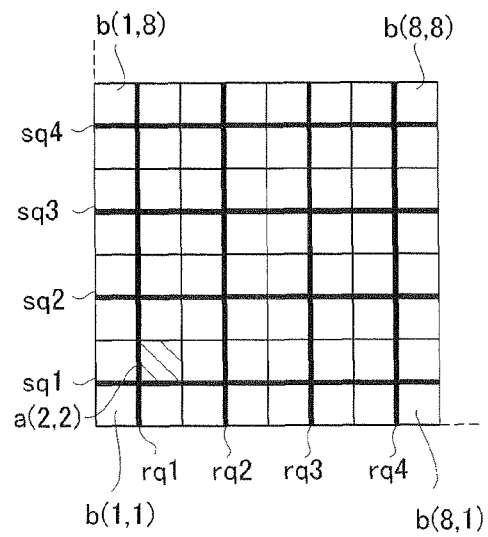

Fig.11
(a)
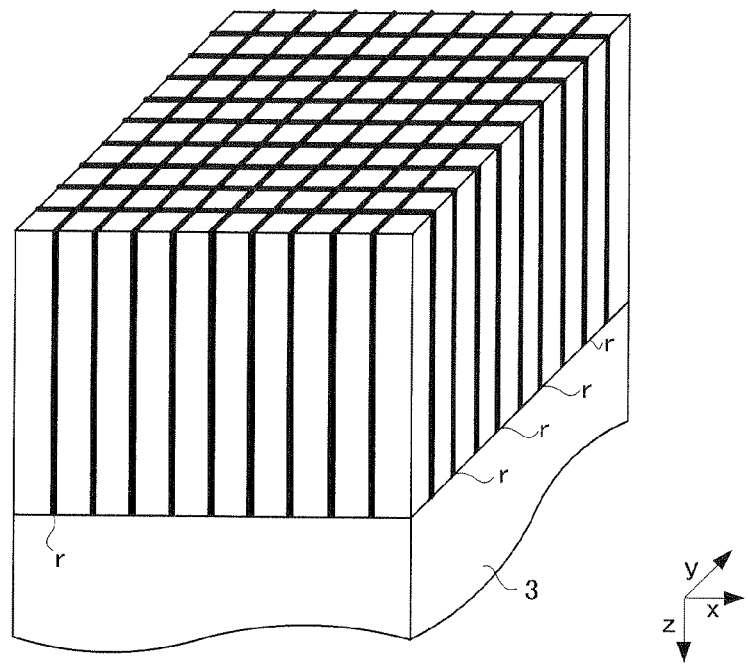
(b)
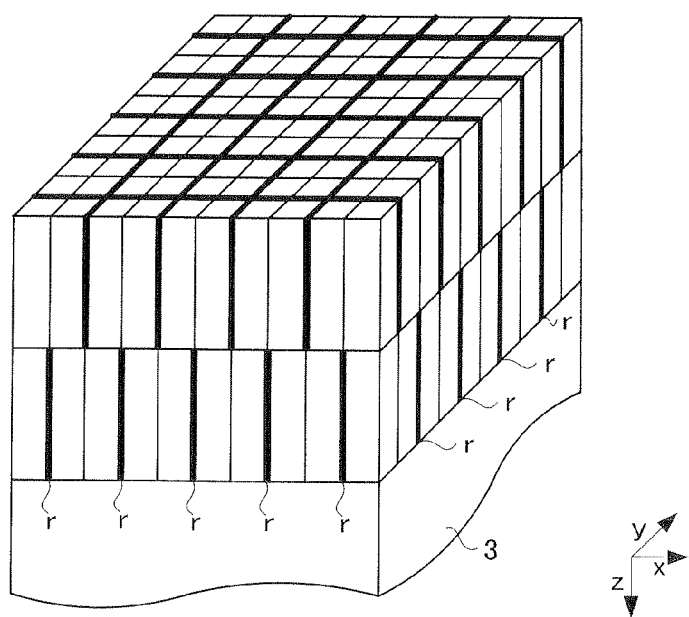

Fig.12
(a) 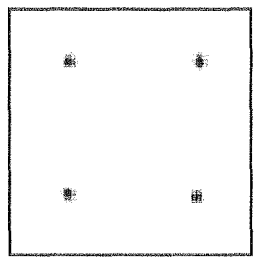
(b) 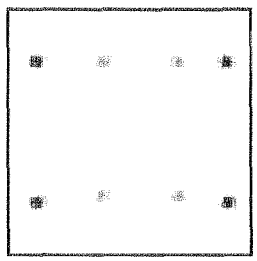
(c) 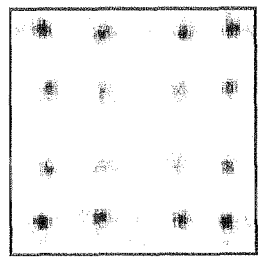
(d) 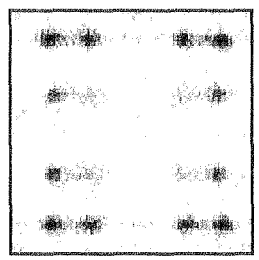
(e) 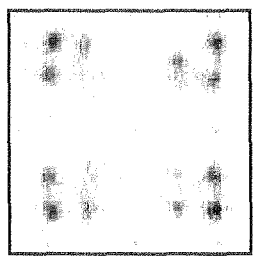
(f) 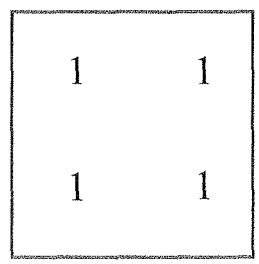
(g) 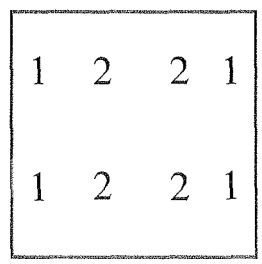
(h) 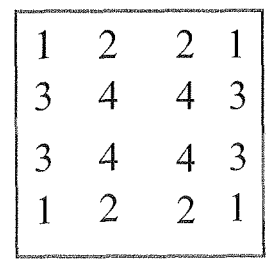

RADIATION DETECTOR AND TOMOGRAPHIC EQUIPMENT PROVIDED WITH THE SAME

BACKGROUND OF THE INVENTION

1. Field of the Invention

This invention relates to a radiation detector having a scintillator, a light guide, and a photomultiplier tube optically coupled in turn, and tomography equipment provided therewith.

2. Description of Related Art

This type of radiation detector is used in emission computed tomography (ECT: Emission Computed Tomography) equipment to detect radiation (such as gamma rays) emitted from radiopharmaceutical that is administered to a subject and is localized to a site of interest for obtaining sectional images of the site of interest in the subject showing radiopharmaceutical distributions. Typical ECT equipment includes, for example, a PET (Positoron Emission Tomography) device and an SPECT (Single Photon Emission Computed Tomography) device. A PET device will be described by way of example. When examinations are performed through a PET device provided with the foregoing radiation detector, radiopharmaceutical labeled with positron emitting nuclides is firstly administered to a subject by injection. The positron emitting nuclides undergo β+ decay within the subject to produce positrons. The positrons immediately collide with electrons in the subject to annihilate, and simultaneously to produce a pair of gamma rays (an annihilation gamma ray-pair) that travels in opposite directions to each other. The PET device obtains sectional images showing radiopharmaceutical distributions in the subject through coincidence of the annihilation gamma ray-pairs with a detector ring.

Such radiation detector arranged in the detector ring of the PET device is often equipped that is capable of position discrimination in a depth direction of a scintillator provided in the radiation detector for improved resolution. Particularly, such radiation detector is used, for example, in a PET device set for animals. FIG. 15 is a perspective view showing a construction of a conventional radiation detector. Such radiation detector 50 is composed of scintillation counter crystal layers 52A, 52B, 52C, and 52D in which scintillation counter crystals 51 of parallelepiped are accumulated in two dimensions, and a photomultiplier tube (PMT) 53 having a function of position discrimination that detects fluorescence irradiated from each of the scintillation counter crystal layers 52A, 52B, 52C, and 52D. Here, each of the scintillation counter crystal layers 52A, 52B, 52C, and 52D is laminated in a z-direction to form a scintillator 52 that converts incident radiation into fluorescence.

As noted above, four scintillation counter crystals are provided for performing more correct position discrimination in a depth direction of the scintillator 52 (a z-direction.) Providing of multiple scintillation counter crystal layers may realize discrimination of an incident position of gamma rays in the scintillation counter crystal layers in the z-direction. Consequently, a discriminative capability of the incident position of gamma rays may be enhanced (see, for example, Patent Literature 1.)

Two or more reflectors 54 are provided in each of the scintillation counter crystal layers 52A, 52B, 52C, and 52D. The reflectors 54 are arranged so as to be inserted between the scintillation counter crystals 51 that forms each of the scintillation counter crystal layers 52A, 52B, 52C, and 52D for reflecting fluorescence produced by the scintillation counter crystals. The reflector 54 does not surround each scintillation counter crystal 51 from every direction, but is provided on two adjacent surfaces of the scintillation counter crystal 51 (see, for example, Patent Literature 1.) Such a construction allows position discrimination in the depth direction of the scintillator crystal layers.

[Patent Literature 1]
Japanese Patent Publication No. 2004-279057

BRIEF SUMMARY OF THE INVENTION

Problem to be Solved by the Invention

However, the conventional examples with such a construction have the following drawback. A scintillator that forms a conventional radiation detector has many scintillation counter crystals, and thus it is difficult to suppress manufacturing costs of the scintillator. In particular, in order to improve spatial resolution of radiation, the scintillator that forms the radiation detector for small animals has many scintillation counter crystals that form one scintillation counter crystal layer. That is, discrimination in the depth direction of the scintillator is conventionally performed through identifying in which scintillation counter crystal layer fluorescence has been emitted. Consequently, the scintillation counter crystal layer is to be provided in a discriminative region in the depth direction of the scintillator. For instance, when four discriminative regions are provided in the depth direction of the scintillator, four scintillation counter crystal layers are to be provided in the scintillator. The scintillation counter crystal layer is formed of thirty-two scintillation counter crystals in an x-direction and thirty-two scintillation counter crystals in a y-direction, and thus 4,096 scintillation counter crystals are required for it only. Therefore, it is difficult to form each of the scintillation counter crystals with sufficient accuracy. In addition, many parts that form the radiation detector will cause reduced yield in manufacturing of the radiation detector.

From the foregoing reasons, a request arises to simplify a construction of the scintillator for suppressing the manufacturing costs without reducing spatial resolution or detection sensitivity of the radiation detector as much as possible.

This invention has been made regarding to the state of the art noted above, and its object is to provide a radiation detector in which a number of scintillation counter crystals forming the radiation detector is suppressed, but spatial resolution or detection sensitivity thereof is not reduced accordingly, as well as tomographic equipment provide therewith.

Means for Solving the Problem

To fulfill the above object, this invention provides the following construction. That is, a radiation detector of this invention includes a scintillator formed of two or more scintillation counter crystals to convert radiation emitted from a radiation source into fluorescence, and a fluorescence detection device to detect fluorescence from the scintillator. The radiation detector includes a first reflector frame in which two or more first reflectors that extend along a first direction while being arranged in a second direction perpendicular to the first direction and two or more second reflectors that extend along the second direction while being arranged in the first direction are arranged in a lattice pattern, and a second reflector frame having two or more reflectors arranged in a lattice pattern as well as the first reflector frame. The first reflector frame and the second reflector frame are laminated along a third direction that is perpendicular to the first direction and the second direction, and each of the scintillation counter crystals is inserted in the third direction through the first reflector frame and the second reflector frame, whereby two or more scintillation counter crystals are arranged in the first direction and the second direction to form a first scintillation counter crystal layer. A position of the first reflector frame provided in the first scintillation counter crystal layer differs from a position of the second reflector frame provided in the first scintillation counter crystal layer.

According to the foregoing invention, a radiation detector may be provided having significantly suppressed manufacturing costs without reducing spatial resolution and detection sensitivity. That is, the reflectors provided in the scintillator according to this invention are designed such that discrimination of fluorescence in the depth direction may be performed in a single scintillation counter crystal layer. More specifically, the first reflector frame is provided in the upper region of the scintillation counter crystal layer, and the second reflector frame is provided in the lower region of the scintillation counter crystal layer. The first reflector frame differs from the second reflector frame in insertion position in the scintillation counter crystal layer. Accordingly, fluorescence generated in the upper region of the scintillation counter crystal layer differs from fluorescence generated in the lower region of the scintillation counter crystal layer in direction where fluorescence spreads, which may realize discrimination of positions where fluorescence is generated in the upper region and the lower region of the scintillation counter crystal layer. In other words, the construction of this invention may enhance discriminative capability of the positions in the depth direction of the scintillator per one scintillation counter crystal layer. Consequently, there is no need for laminating multiple scintillation counter crystal layers as in conventional examples. Specifically, the one scintillation counter crystal layer in this invention has a function for two conventional layers. Therefore, a radiation detector may be provided having fewer scintillation counter crystal layers in number, i.e., fewer scintillation counter crystals in number, while maintaining its performance.

According to the construction of this invention, a radiation detector of high time resolution may be provided. The more scintillation counter crystal layers the scintillator has, the lower time resolution the radiation detector has. That is because a path where fluorescence travels until entering into a fluorescence detection device becomes complicated as the scintillation counter crystal layers increase in number, which leads to time width for detecting fluorescence. On the other hand, however, when the scintillation counter crystal layers are reduced in number, information on a height direction of the scintillator cannot be obtained, which leads to reduced spatial resolution. Contrary to such technical common knowledge, this invention has a construction to reduce the scintillation counter crystal layers in number while obtaining information of positions in the height direction of the scintillator. Accordingly, with the construction of this invention, a radiation detector may be obtained having high time resolution while maintaining the spatial resolution of the radiation detector.

Moreover, the scintillator of the foregoing radiation detector preferably further includes a second scintillation counter crystal layer composed of two or more scintillation counter crystals in an interposed position between the first scintillation counter crystal layer and the fluorescence detection device. The second scintillation counter crystal layer preferably includes a third reflector frame having two or more reflectors arranged in a lattice pattern as well as the first reflector frame, and a fourth reflector frame having two or more reflectors arranged in a lattice pattern as well as the third reflector frame. The third reflector frame and the fourth reflector frame are preferably laminated along a third direction that is perpendicular to the first direction and the second direction, and each of the scintillation counter crystals is inserted in the third direction through the third reflector frame and the fourth reflector frame, whereby two or more scintillation counter crystals are arranged in the first direction and the second direction to form a second scintillation counter crystal layer. A position of the third reflector frame provided in the second scintillation counter crystal layer preferably differs from a position of the fourth reflector frame provided in the second scintillation counter crystal layer.

According to the foregoing construction, a radiation detector may be provided having significantly suppressed manufacturing costs without reducing spatial resolution and detection sensitivity. That is, the reflectors provided in the scintillator according to this invention are designed such that position discrimination of fluorescence may be performed in the upper region and the lower region of the first scintillation counter crystal layer. Moreover, position discrimination of fluorescence may be performed also in the upper region and the lower region of the second scintillation counter crystal layer. Specifically, the two scintillation counter crystal layers in this invention has a function for four conventional layers. Therefore, a radiation detector may be provided having fewer scintillation counter crystal layers in number, i.e., fewer scintillation counter crystals in number, while maintaining its performance.

Moreover, the radiation detector according to this invention may include a scintillator formed of two or more scintillation counter crystals to convert radiation emitted from a radiation source into fluorescence, and a fluorescence detection device to detect fluorescence from the scintillator. The radiation detector may include a first reflector frame in which two or more first reflectors that extend along a first direction while being arranged in a second direction perpendicular to the first direction and two or more second reflectors that extend along the second direction while being arranged in the first direction are arranged in a lattice pattern, and a second reflector frame, a third reflector frame, and a fourth reflector frame each having two or more reflectors arranged in a lattice pattern as well as the first reflector frame. The first reflector frame, the second reflector frame, the third reflector frame, and the fourth reflector frame may be laminated along a third direction perpendicular to the first direction and the second direction, and each of the scintillation counter crystals is inserted in the third direction through the first reflector frame, the second reflector frame, the third reflector frame, and the fourth reflector frame, whereby two or more scintillation counter crystals are arranged in the first direction and the second direction to form a scintillation counter crystal layer. An inserting position in the scintillation counter crystal layer differs from one another in the first reflector frame, the second reflector frame, the third reflector frame, and the fourth reflector frame.

According to the foregoing construction, a radiation detector may be provided having high spatial resolution and time resolution as well as significantly suppressed manufacturing costs only with a single scintillation counter crystal layer.

Moreover, the first reflector frame and the second reflector frames in the foregoing first scintillation counter layer are preferably formed of two or more first reflectors and two or more second reflectors, respectively. Each of the first reflectors and the second reflectors preferably has two or more grooves formed along the third direction. Furthermore, the grooves each provided in the first reflectors and the second reflectors are preferably fitted to form the first reflector frame and the second reflector frame.

Moreover, the third reflector frame and the fourth reflector frames in the foregoing second scintillation counter layer are preferably formed of two or more first reflectors and two or more second reflectors, respectively. Each of the first reflectors and the second reflectors preferably has two or more grooves formed along the third direction. Furthermore, the grooves each provided in the first reflectors and the second reflectors are preferably fitted to form the third reflector frame and the fourth reflector frame.

With the foregoing construction, a radiation detector having a scintillator of high quality may be provided more readily. The scintillation counter crystal layer in this invention has two reflector frames arranged therein. Accordingly, more reflectors in number are to be arranged in per scintillation counter crystal layer. Even when so, however, each of the reflector frames may be formed more readily so as to fit the grooves provided in the first reflectors and the second reflectors to form each of the reflector frames. Moreover, support is given to the first reflectors and the second reflectors to make each of the reflector frames integrated. Consequently, the scintillator may be manufactured more readily. Furthermore, the reflector frame supports each of the scintillation counter crystals, and thus the scintillator may be manufactured having more uniform quality.

It is more preferable to provide a transparent material that allows fluorescence to pass through so as to surround each of the scintillation counter crystals that form the foregoing scintillator.

According to the construction, a radiation detector may be provided having a scintillator more suitable for discrimination position of generating fluorescence. In the foregoing construction, one of the reflector and the transparent material is provided between the scintillation counter crystals adjacent to each other. With such a configuration, the scintillation counter crystals may be optically coupled to one another in a direction where the scintillation counter crystals extend. With such a configuration, fluorescence that travels across the adjacent scintillation counter crystals may be introduced into the fluorescence detection device without being reduced as much as possible. Therefore, the radiation detector may be provided having improved detection sensitivity and resolution.

Moreover, four scintillation counter crystals are preferably inserted in each of sections divided by a reflector lattice of the reflector frame provided in the foregoing scintillator.

According to the foregoing construction, position discrimination of fluorescence generated inside the scintillator may be ensured. Specifically, each of the scintillation counter crystals may have a suitable number of reflectors. Thus, a number of the reflectors to enclose scintillation counter crystals as well as positions where the reflectors are to be inserted may differ in regions where each of the reflector frames extend. That is, surfaces of the scintillation counter crystals that are surrounded by the reflectors may differ in each of the region where each of the reflector frames extends. Thus, when fluorescence emitted from each of the regions enters into the PMT, intensity distributions of fluorescence differ from one another. As mentioned above, position discrimination in a depth direction of the scintillator may be performed more accurately, and a radiation detector having higher spatial resolution may be provided.

Moreover, tomography equipment according to this invention includes a detector ring to generate radiation detection data with the above radiation detector being arranged in a ring shape, a coincidence device to perform coincidence of the radiation detector data, a fluorescence generating position discrimination device to discriminate a position of generating fluorescence in the detector ring, and an image formation device to receive analytical data sent from the fluorescence generating position discrimination device to form a sectional image of a subject.

According to the foregoing invention, tomography equipment may be provided having significantly suppressed manufacturing costs without reducing spatial resolution and detection sensitivity. There are fewer scintillation counter crystals in number that form the scintillator in this invention, but the spatial resolution and detection sensitivity thereof will not be reduced accordingly. Considering fewer scintillation counter crystals in number that form the tomography equipment, the tomography equipment of low cost may be provided.

Moreover, high time resolution of the radiation detector may improve spatial resolution of the tomography equipment. The radiation detector with the foregoing construction has improved time resolution compared with the conventional one. Consequently, the tomography equipment provided therewith may output clear sectional images suitable for diagnosis.

Effect of the Invention

With the radiation detector according to this invention and the tomography equipment provided therewith, the construction may be provided having significantly suppressed manufacturing costs without reducing spatial resolution and detection sensitivity. That is, the reflectors provided in the scintillator according to this invention are designed such that position discrimination of fluorescence in the depth direction may be performed in a single scintillation counter crystal layer. More specifically, the first reflector frame is provided in the upper region of the scintillation counter crystal layer, and the second reflector frame is provided in the lower region of the scintillation counter crystal layer. The first reflector frame differs from the second reflector frame in inserting position in the scintillation counter crystal layer. Accordingly, fluorescence generated in the upper region of the scintillation counter crystal layer differs from fluorescence generated in the lower region of the scintillation counter crystal layer in direction where fluorescence spreads, which may realize discrimination of positions where fluorescence is generated in the upper region and the lower region of the scintillation counter crystal layer. With the foregoing construction of the scintillator, a number of the scintillation counter crystals that form the scintillator may be suppressed. Therefore, the radiation detector and the tomography equipment provided therewith may be provided having significantly suppressed manufacturing costs without reducing spatial resolution and detection sensitivity.

BRIEF DESCRIPTION OF THE SEVERAL VIEWS OF THE DRAWINGS

FIG. 6 is a plan view of each of the reflector frames according to Embodiment 1 seen from xy-side end face thereof;

FIG. 11 is a perspective view showing requirements for examinations according to Embodiment 2;

FIG. 12 is an explanatory view showing results of the examinations according to Embodiment 2;

Figure 1:
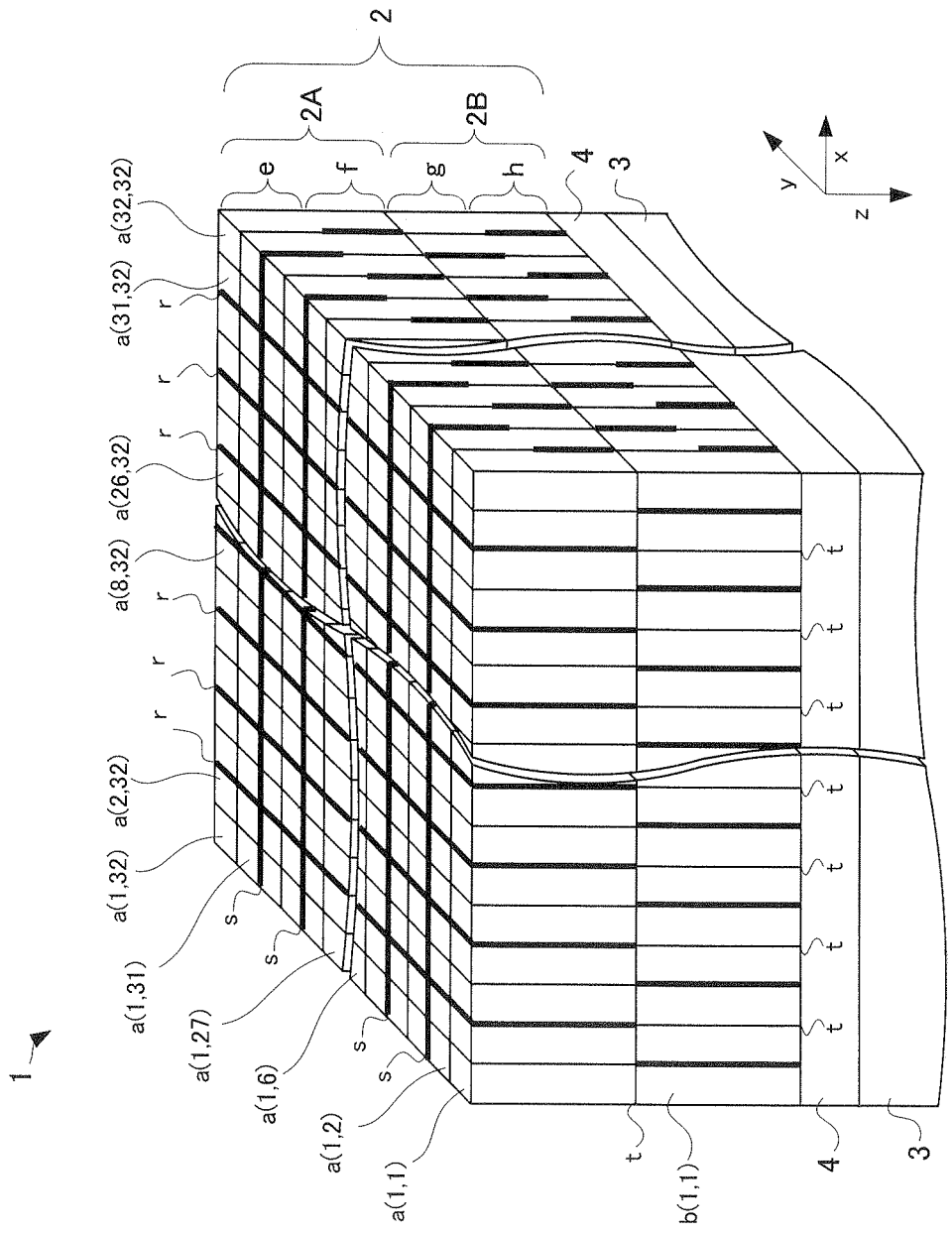
FIG. 1 is a perspective view of a radiation detector according to Embodiment 1.

DESCRIPTION OF REFERENCES 1 radiation detector
2 scintillator
2A first scintillation counter crystal layer
2B second scintillation counter crystal layer
3 PMT (fluorescence detection device)
5, 6 groove
7 first reflector frame
8 second reflector frame
9 third reflector frame
10 fourth reflector frame
20 PET device (tomography equipment)
22 detector ring
30 coincidence unit (coincidence device)
31 fluorescence position discrimination unit (fluorescence position discrimination device)
32 absorption correction unit (absorption correction device)

DETAILED DESCRIPTION OF THE INVENTION

Embodiments of a radiation detector according to this invention and tomography equipment provided therewith will be described hereinafter with reference to the drawings.

Embodiment 1

Firstly, description will be given to a construction of a radiation detector according to Embodiment 1. FIG. 1 is a perspective view of the radiation detector according to Embodiment 1.

(1) A Schematic Construction of a Radiation Detector

As shown in FIG. 1, the radiation detector 1 according to Embodiment 1 includes a scintillator 2 that is formed of scintillation counter crystal layers each laminated in order of a scintillation counter crystal layer 2A, a scintillation counter crystal layer 2B in a z-direction, a photomultiplier tube (hereinafter referred to as PMT) 3 that is provided on an undersurface of the scintillator 2 for detecting fluorescence emitted from the scintillator 2, and a light guide 4 interposed between the scintillator 2 and the PMT 3. The PMT 3 is multi-anode type, and allows position discrimination of incident fluorescence in the x and y. The light guide 4 is provided for guiding fluorescence generated in the scintillation 2 into the PMT 3. Consequently, the light guide 4 is optically coupled to the scintillator 2 and the PMT 3.

(2) A Construction of the Scintillator

The scintillator 2 has the scintillation counter crystals 2A and the scintillation counter crystals 2B laminated suitable for detection of gamma rays in a three-dimensional array. That is, the scintillation counter crystal is composed of Ce-doped $Lu_{2(1-X)}Y_{2X}SiO_5$ (hereinafter referred to as LYSO.) Each of the scintillation counter crystals is, for example, a parallelepiped having a width of 1.45 mm in the x-direction, a width of 1.45 mm in the y-direction, and a height of 9 mm in the z-direction regardless of the scintillation counter crystal layer. The scintillator 2 has four side end faces that are covered with a reflective film not shown. Consequently, each of the scintillation counter crystal layers is laminated in a direction toward the PMT 3. Here, the scintillation counter crystal layer 2A corresponds to an incident surface of gamma rays in the scintillator 2. The PMT3 discriminates fluorescence emitted in the scintillation counter crystal layer 2A and the scintillation counter crystal layer 2B. Moreover, the PMT 3 discriminates fluorescence emitted in the upper region of the scintillation counter crystal layer 2A (hereinafter referred to as a first region) e and the lower region of the scintillation counter crystal layer 2A (hereinafter referred to as a second region) f. Furthermore, the PMT 3 discriminates fluorescence emitted in the upper region of the scintillation counter crystal layer 2B (hereinafter referred to as a third region) g and the lower region of the scintillation counter crystal layer 2B (hereinafter referred to as a fourth region) h. That is, the radiation detector 1 according to Embodiment 1 has four discriminative regions, i.e., the first region e, the second region f, the third region g, and the fourth region h, that may be discriminated from one another. Here, the PMT 3 and gamma rays correspond to the fluorescence detection device and radiation, respectively, in this invention.

The scintillation counter crystal layer 2A corresponds to a receiver of the gamma rays emitted from a radioactive source. The scintillation counter crystals in a block shape are arranged in a matrix in a two-dimensional array with thirty-two numbers of the scintillation counter crystals in an x-direction and thirty-two numbers of the scintillation counter crystals in a y-direction relative to a scintillation counter crystal a (1, 1). That is, the scintillation counter crystals from a (1, 1) to a (1, 32) are arranged in the y-direction to form a scintillator crystal array. Thirty-two numbers of the scintillator crystal arrays are arranged in the x-direction to form a scintillation counter crystal layer 2A. The scintillation counter crystal layer 2A has the a first reflector frame 7 and a second reflector frame 8, mentioned later, that are laminated in the z-direction. Here, the x-direction, the y-direction, and the z-direction are perpendicular to one another. Moreover, each of the scintillation counter crystals that form the scintillation counter crystal layer 2A is inserted so as to pass through the first reflector frame 7 and the second reflector frame 8 in the z-direction. Here, the scintillation counter crystal layer 2A corresponds to the first scintillation counter crystal layer in this invention. The x-direction, the y-direction, and the z-direction correspond to the first direction, the second direction, and the third direction, respectively, in this invention.

Here, as for the scintillation counter crystal layers 2B, thirty-two numbers of the scintillator counter crystals are also arranged in the x-direction and the y-direction in a matrix in a two-dimensional array relative to a scintillation counter crystal b (1, 1). In each of the scintillation counter crystal layers 2A and 2B, a transparent material t is also provided between the scintillation counter crystals adjacent to each other. Consequently, each of the scintillation counter crystals is to be enclosed with the transparent material t. The transparent material t has a thickness around 25 μm. The scintillation counter crystal layer 2B has the a third reflector frame 9 and a fourth reflector frame 10, mentioned later, that are laminated in the z-direction. Here, the x-direction, the y-direction, and the z-direction are perpendicular to one another. Moreover, each of the scintillation counter crystals that form the scintillation counter crystal layer 2B is inserted so as to pass through the third reflector frame 9 and the fourth reflector frame 10 in the z-direction. Here, the scintillation counter crystal layer 2B corresponds to the second scintillation counter crystal layer in this invention.

Each of the scintillation counter crystal layers 2A, and 2B is optically coupled, and includes a transparent material t between each of the layers. The transparent material t passes through fluorescence generated in the scintillation counter crystal layers to guide the fluorescence into the PMT 3. The transparent material t also joins the scintillation counter crystals adjacent to one another in the z-direction.

A thermosetting resin composed of a silicone resin may be used for the transparent material t.

(3) A Construction of the Reflectors

Figure 2:
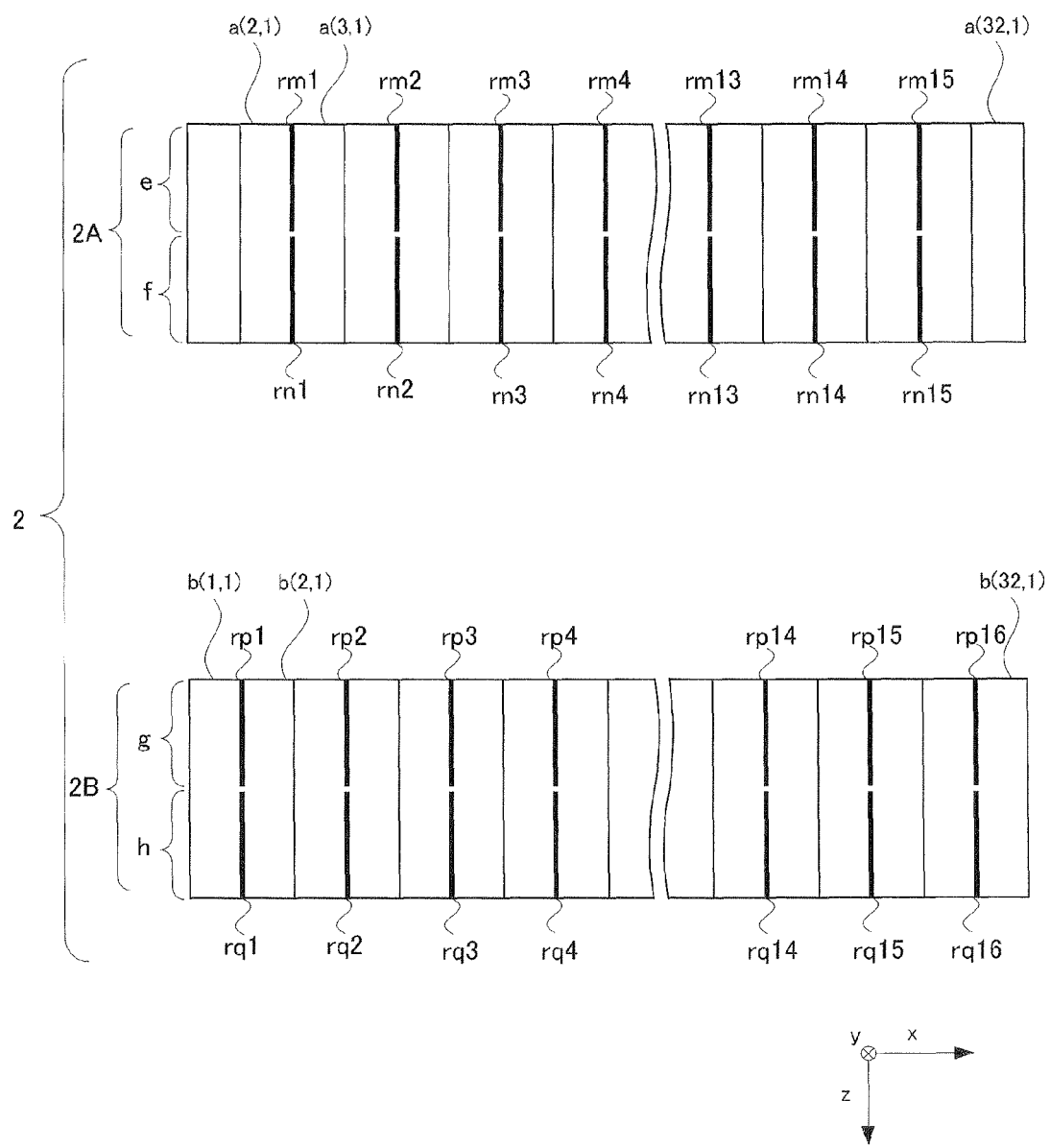
FIG. 2 is a plan view of a scintillator according to Embodiment 1 seen from zx-side end face thereof.

Next, description will be given to the reflectors. Reflectors s, and r are provided in each of the scintillation counter crystal layers 2A, and 2B. As shown in FIG. 1, the first reflector r and the second reflector s that are formed of plastic films, such as a polyester film, and has a thickness of 125 μm, for example, are provided in a position interposed between the scintillation counter crystals adjacent to one another. Firstly, description will be given to the first reflectors r. FIG. 2 is a plan view of the scintillator according to Embodiment 1 when seen from the zx-side end face thereof. As shown in FIG. 2, any first reflector r is plate-like and extends in the x-direction and z-direction. The first reflector r is inserted in the gap between the scintillation counter crystals in the scintillation counter crystal layer 2A. The height thereof in the z-direction is set, for example, at 4.5 mm.

Directing attention to the scintillation counter crystal layer 2A, a reflector rm is inserted in the first region e, and a reflector rn is inserted in the second region f. The first reflectors rm1 and rn1 are inserted between, for example, a (2,1) and a (3,1) among thirty-two numbers of the scintillation counter crystals arranged in the x-direction. Accordingly, scintillation counter crystals of even numbers in the x-direction are arranged on a left hand of the first reflectors rm and rn, and scintillation counter crystals of odd numbers in the x-direction on a right hand of the first reflectors rm and rn. Fifteen numbers of the first reflectors rm and rn are each provided in the scintillation counter crystal layer 2A.

Similarly, directing attention to the scintillation counter crystal layer 2B, a reflector rp is inserted in the third region g, and a reflector rq is inserted in the fourth region h. However, the inserting thereof differs from that in the scintillation counter crystal layer 2A. Specifically, scintillation counter crystals of odd numbers are arranged in the x-direction on a left hand of the first reflectors rp and rq, and scintillation counter crystals of even numbers in the x-direction on a right hand of the first reflectors rp and rq. Sixteen numbers of the first reflectors rp and rq are each provided in the scintillation counter crystal layer 2B. Here, the scintillation counter crystal layer 2B corresponds to the second scintillation counter crystal layer in this invention.

Figure 3:
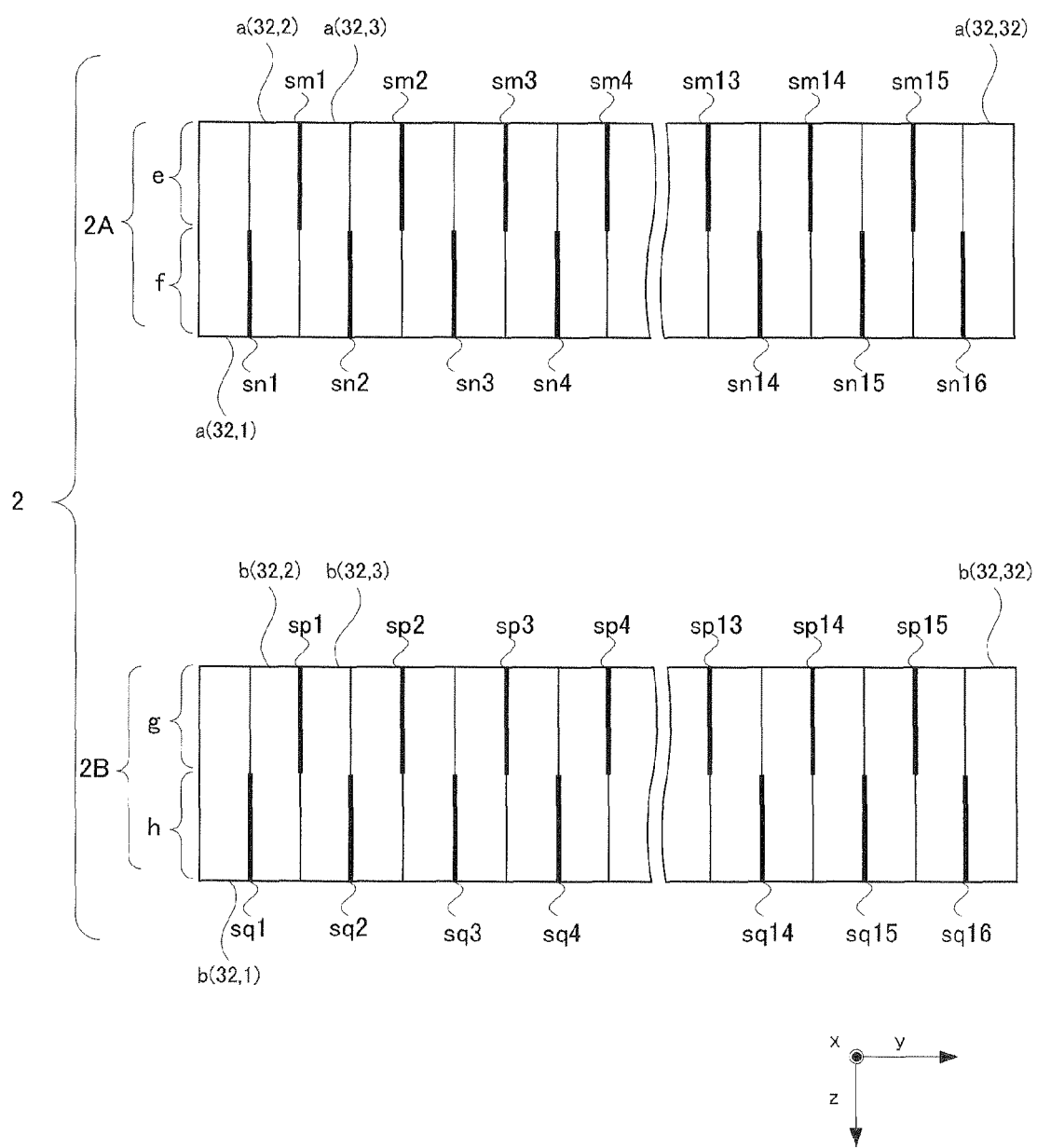
FIG. 3 is a plan view of the scintillator according to Embodiment 1 seen from yz-side end face thereof.

Next, description will be given to the yz-side end face having the scintillator according to each embodiment. FIG. 3 is a plan view of the scintillator according to Embodiment 1 when seen from the yz-side end face thereof. As shown in FIG. 3, any second reflector s is plate-like and extends in the x-direction and z-direction. The second reflector s is inserted in the gap between the scintillation counter crystals in the scintillation counter crystal layer 2A. The height thereof in the z-direction is set, for example, at 4.5 mm.

Directing attention to the scintillation counter crystal layer 2A, a second reflector sm is inserted in the first region e, and a second reflector sn is inserted in the second region f. The second reflectors sm1 is inserted between, for example, a (32, 2) and a (32, 3), for example, among thirty-two numbers of the scintillation counter crystals arranged in the y-direction. Accordingly, scintillation counter crystals of even numbers in the y-direction are arranged on a left hand of the second reflector sm, and scintillation counter crystals of odd numbers in the y-direction on a right hand of the second reflector sm. On the other hand, the second reflector sn is inserted in a position in the scintillation counter crystal layer different from that where the second reflector sm is inserted. Specifically, scintillation counter crystals of odd numbers are arranged in the y-direction on a left hand of the second reflectors sn, and scintillation counter crystals of even numbers in the y-direction on a right hand of the second reflectors sn. Here, fifteen numbers of the second reflector sm are provided in the scintillation counter crystal layer 2A, and sixteen numbers of the second reflector sn are provided in the scintillation counter crystal layer 2A.

Similarly, directing attention to the scintillation counter crystal layer 2B, a second reflector sp is inserted in the third region g, and a second reflector sq is inserted in the fourth region h between the gaps of the scintillation counter crystals in the scintillation counter crystal layer 2B. The inserting position thereof is the same as that in the scintillation counter crystal layer 2A. Specifically, scintillation counter crystals of even numbers are arranged in the y-direction on a left hand of the second reflectors sp, and scintillation counter crystals of odd numbers in the y-direction on a right hand of the second reflectors sp. And scintillation counter crystals of even numbers are arranged in the y-direction on a left hand of the second reflectors sq, and scintillation counter crystals of odd numbers in the y-direction on a right hand of the second reflectors sq. Here, fifteen numbers of the second reflector sp are provided in the scintillation counter crystal layer 2B, and sixteen numbers of the second reflector sq are provided in the scintillation counter crystal layer 2B.

(4) A Construction of the Reflector Frame

Figure 4:
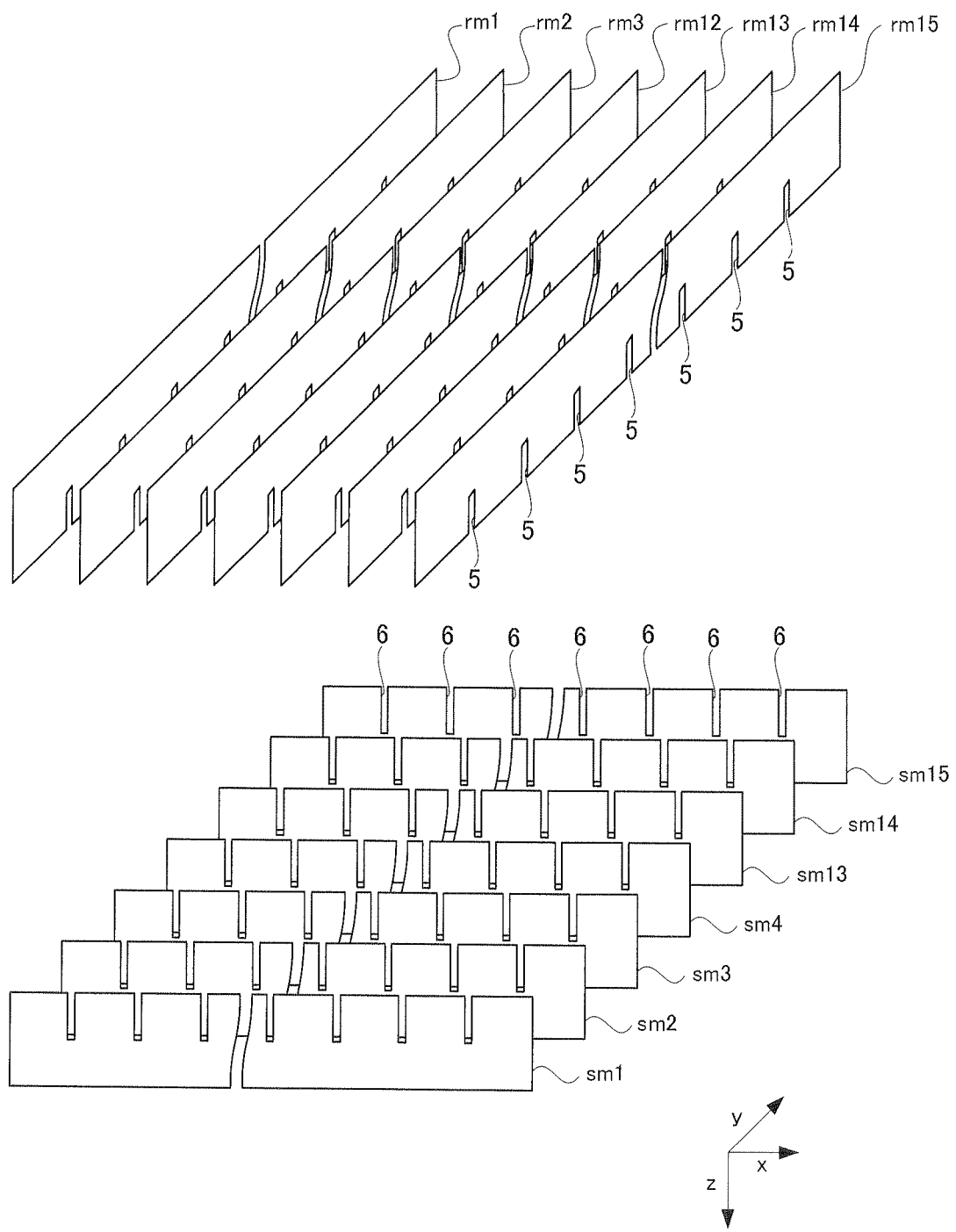
FIG. 4 is an exploded perspective view showing a construction of a reflector frame formed by first reflectors and the second reflectors according to Embodiment 1.
Figure 5:
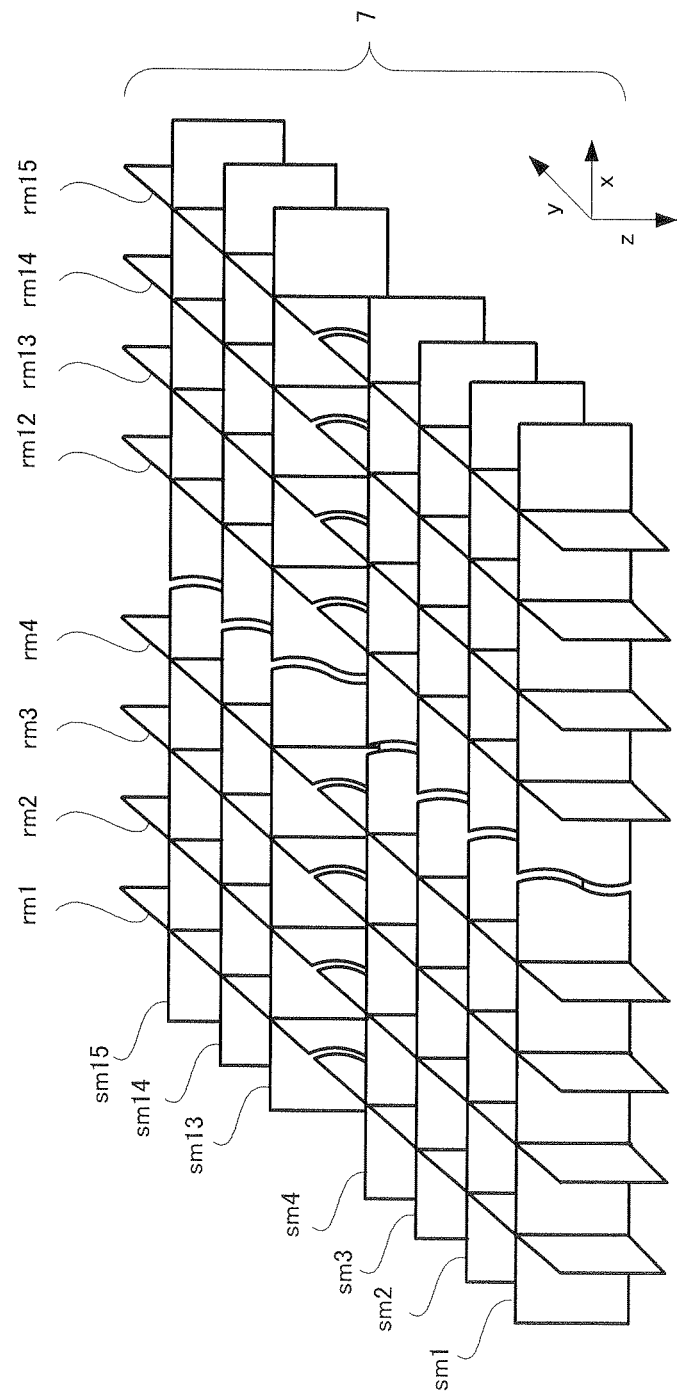
FIG. 5 is a perspective view showing a construction of a reflector frame formed by first reflectors and the second reflectors according to Embodiment 1.

Next, description will be given to constructions of the first reflectors r and the second reflectors s provided in each of the scintillation counter crystal layer. FIGS. 4 and 5 are perspective views each showing a construction of a reflector frame formed by first reflector and the second reflector according to Embodiment 1. Here, description will be given to constructions of the first reflector rm and the second reflector sm provided in the upper region of the scintillation counter crystal layer 2A as one example. The first reflector rm and the second reflector sn, the first reflector rp and the second reflector sp, and the first reflector rq and the second reflector sq have a similar construction as above.

As shown in FIG. 4, the first reflectors rm and the second reflectors sm are perpendicular to each other. Grooves 5 are formed in the first reflectors rm that extend downward in the z-direction. Grooves 6 are formed in the second reflectors sm that extend upward in the z-direction. The first reflector rm and the second reflector sm are integrated by fitting the grooves 5 and grooves 6 to form a reflector frame 7, as shown in FIG. 5. Moreover, four scintillation counter crystals arranged in a matrix in a two-dimensional array are inserted in each of sections divided by the first reflector frame 7. Therefore, the reflector frame 7 supports each of the scintillation counter crystals.

The number of grooves 5 provided in the first reflector rm is the same as the number of the second reflector sm arranged in the scintillation counter crystal layer 2A. In contrast, the number of grooves 6 provided in the second reflector sm is the same as the number of the first reflector rm arranged in the scintillation counter crystal layer 2A. The sum of lengths of the grooves 5 and grooves 6 in the z-direction corresponds to heights of both reflectors rm and sm in the z-direction. The lengths of grooves 5 and grooves 6 are preferably of one-half of the heights of both reflectors rm and sm in the z-direction.

As with the foregoing first reflector frame 7, a second reflector frame 8 is formed by a first reflector rn and a second reflector sn. Moreover, a third reflector frame 9 is formed by a first reflector rp and a second reflector sp. A fourth reflector frame 10 is formed by a first reflector rq and a second reflector sq. The first reflector frame 7 is arranged in the first region e of the scintillation counter crystal layer 2A. The second reflector frame 8 is arranged in the second region f of the scintillation counter crystal layer 2A. Moreover, the third reflector frame 9 is arranged in the third region g of the scintillation counter crystal layer 2B. The fourth reflector frame 10 is arranged in the fourth region h of the scintillation counter crystal layer 2B. Furthermore, inserting positions of the reflector frames 7, 8, 9, and 10 in the scintillator 2 are shifted relative to one another by one scintillation counter crystal in x- and y-directions when seen from the xy-plane of the scintillator 2. FIG. 6 is a plan view of each reflector frames according to Embodiment 1 when seen from the xy-plane thereof, and (a), (b), (c) and (d) in the drawing illustrate constructions of the first region e in the scintillation counter crystal layers 2A, the second region f in the scintillation counter crystal layers 2B, the third region g in the scintillation counter crystal layers 2C, and the fourth region h in the scintillation counter crystal layers 2D (hereinafter appropriately referred to as "four regions"), respectively. The first reflector frame 7 provided in the first region e is shifted toward the y-direction by one scintillation counter crystal that forms the scintillation counter crystal layer to be in an inserting position of the second reflector frame 8 into the second region f. In addition, the first reflector frame 7 provided in the first region e is shifted toward the x-direction by one scintillation counter crystal that forms the scintillation counter crystal layer to be in an inserting position of the third reflector frame 9 into the third region g. Likewise, the first reflector frame 7 provided in the first region e is shifted toward the x-direction and the y-direction by one scintillation counter crystal that forms the scintillation counter crystal layer to be in an inserting position of the fourth reflector frame 10 into the fourth region h. FIG. 6 illustrates a portion of the scintillator 2 according to Embodiment 1.

(5) Discrimination Processes of Positions where Fluorescence is Generated.

Next, description will be given to processes of discriminating fluorescence generating positions in the x-, y-, and z-directions in the radiation detector 1 according to Embodiment 1. Gamma rays entering into the scintillator 2 is converted into fluorescence in any of four regions. The fluorescence travels in a direction toward the light guide 4, and then enters into the PMT 3 through the light guide 4. The PMT 3 is multi-anode type, and allows voltages of the detection signals to be outputted to vary gradually in accordance with incident positions. Consequently, position discrimination of incident fluorescence into the PMT 3 in x- and y-directions may be performed.

Next, description will be given to processes of discriminating fluorescence generating positions in the z-direction in the radiation detector 1 with reference again to FIG. 6. As shown in FIG. 6, the four regions of the scintillator 2 differ from one another in inserting positions of the first reflectors r and the second reflectors s. Directing attention to the scintillation counter crystals a (2, 2), b (2, 2) on (2, 2) (shown in hatching in FIG. 6) in (a), (b), (c), and (d) in the drawing, the four regions differ from one another in inserting positions of the reflectors r and s. The fluorescence generated in the scintillation counter crystal reaches the PMT 3 while spreading in the x- and y-directions. Providing the reflectors r and s leads to addition of directivity to the spreading. Moreover, comparing fluorescence generated in the four regions in the same xy positions, they differ from one another in direction of spreading. That is, differences in position of generating fluorescence in the z-direction in the scintillator 2 are to be converted into differences of fluorescence in the xy-directions. The PMT 3 may detect a slight deviation of the fluorescence in the xy-directions due to the differences in the position in the z-direction, and may determine from it which region in the four regions corresponds to the position of generating fluorescence in the z-direction.

As noted above, according to the construction of Embodiment 1, a radiation detector 1 of significantly suppressed manufacturing costs may be provided without reducing spatial resolution and detection sensitivity as much as possible. That is, the reflectors r and s provided in the scintillator 2 according to Embodiment 1 are designed such that discrimination of fluorescence in the depth direction may be performed in each of the scintillation counter crystal layers 2A and 2B. Specifically, the first reflector frame 7, the second reflector frame 8, the third reflector frame 9, and the fourth reflector frame 10 are provided in first region e of the scintillation counter crystal layer 2A, the second region f of the scintillation counter crystal layer 2A, the third region g of the scintillation counter crystal layer 2B, and the fourth region h of the scintillation counter crystal layer 2B (four regions.) Each of the reflector frames 7, 8, 9, and 10 has a different inserting position in the scintillation counter crystal layer. Thus, directions where light spreads differ in the four regions in the scintillator, whereby positions of generating fluorescence may be discriminated in the four regions in the scintillator 2. That is, according to the construction of this invention, the two scintillation counter crystal layers in this invention have a function for four conventional layers. Therefore, a radiation detector may be provided having fewer scintillation counter crystal layers in number, i.e., fewer scintillation counter crystals in number, while maintaining its performance.

Embodiment 2

Figure 7:
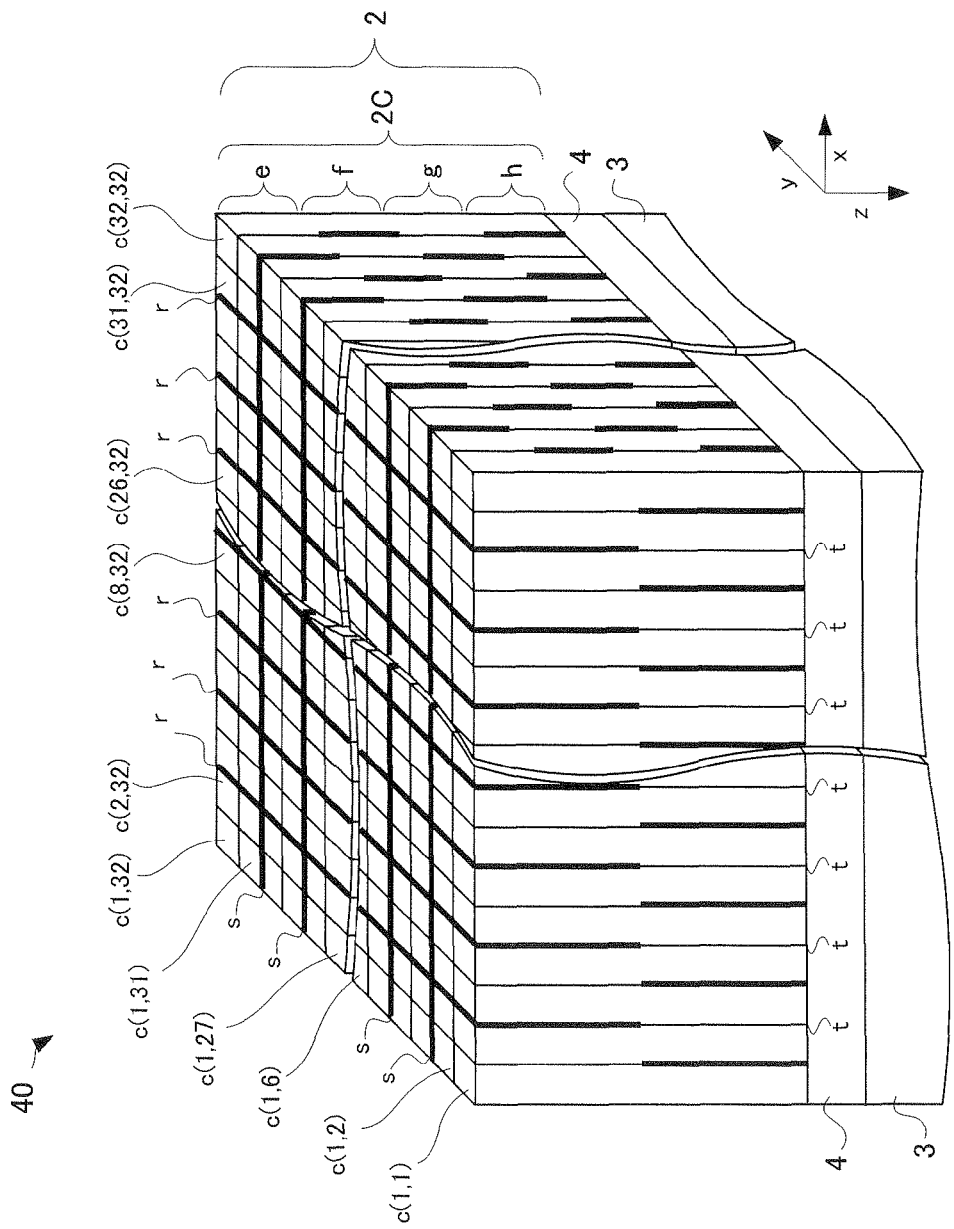
FIG. 7 is a perspective view of a radiation detector according to Embodiment 2.

Next, description will be given to a construction of a radiation detector according to Embodiment 2. Description will be given to a construction of a radiation detector 40 according to Embodiment 2. As shown in FIG. 7, the radiation detector 40 according to Embodiment 2 has the same construction as the radiation detector according to Embodiment 1. However, the scintillator 2 provided in the radiation detector of Embodiment 2 is characteristic. Specifically, the scintillator 2 has only a single scintillation counter crystal layer 2C, and does not have the scintillation counter crystal layers 2A and 2B of two layers as the scintillator 2 of Embodiment 1.

Description will be given to a construction of the scintillation counter crystal layer 2C. As shown in FIG. 7, the scintillation counter crystal layer 2C has the first region e, the second region f, the third region g, and the fourth region h where positions of generating fluorescence may be discriminated from one another.

The scintillation counter crystal layer 2C corresponds to a receiver of gamma rays emitted from a radioactive source. The scintillation counter crystals in a block shape are arranged in a two-dimensional array with thirty-two numbers of the scintillation counter crystals in an x-direction and thirty-two numbers of the scintillation counter crystals in a y-direction relative to a scintillation counter crystal c (1, 1). That is, the scintillation counter crystals from c (1, 1) to c (1, 32) are arranged in the y-direction to form a scintillator crystal array. Thirty-two numbers of the scintillator crystal arrays are arranged in the x-direction to form a scintillation counter crystal layer 2C. Here, the scintillation counter crystal layer 2C has a first reflector frame 47, the second reflector frame 48, the third reflector frame 49, and the fourth reflector frame 50 laminated in the z-direction. Moreover, each of the scintillation counter crystals that forms the scintillation counter crystal layer 2C is inserted so as to pass through the first reflector frame 47, the second reflector frame 48, the third reflector frame 49, and the fourth reflector frame 50

Figure 8:
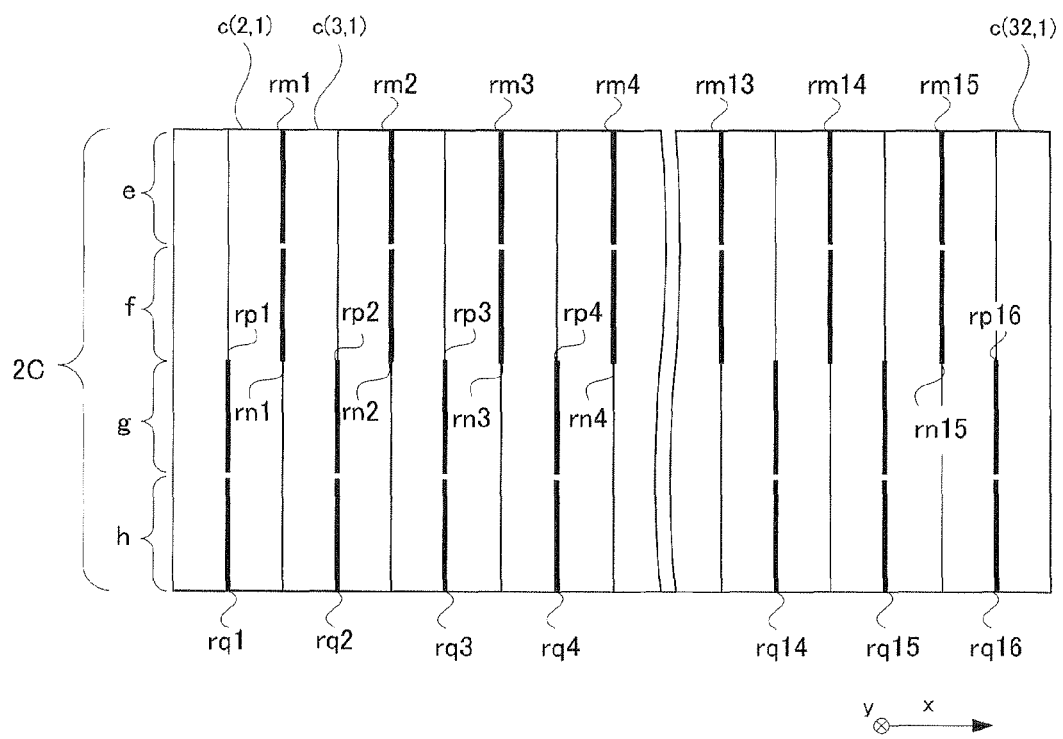
FIG. 8 is a plan view of a scintillator according to Embodiment 2 seen from zx-side end face thereof.

FIG. 8 is a plan view of the scintillator according to Embodiment 2 when seen from the zx-side end face thereof. As shown in FIG. 2, any first reflector r is plate-like and extends in the y-direction and z-direction. The first reflector r is inserted in the gap between the scintillation counter crystals in the scintillation counter crystal layer 2A. The height thereof in the z-direction is set, for example, at 9 mm.

In the scintillation counter crystal layer 2C, a reflector rm is inserted in the first region e, and a reflector rn is inserted in the second region f. The first reflectors rm1 and rn1 are inserted between, for example, a (2,1) and a (3,1) among thirty-two numbers of the scintillation counter crystals arranged in the x-direction. Thus, scintillation counter crystals of even numbers in the x-direction are arranged on a left hand of the first reflectors rm and rn, and scintillation counter crystals of odd numbers in the x-direction on a right hand of the first reflectors rm and rn. Fifteen numbers of the first reflectors rm and rn are each provided in the scintillation counter crystal layer 2A.

Likewise, in the scintillation counter crystal layer 2C, a first reflector rp is inserted in the third region g, and a first reflector rq is inserted in the fourth region h between the gaps of the scintillation counter crystals. However, the inserting thereof differs from that in first region e and the second region f. Specifically, scintillation counter crystals of odd numbers are arranged in the x-direction on a left hand of the first reflectors rp and rq, and scintillation counter crystals of even numbers in the x-direction on a right hand of the first reflectors rp and rq. Sixteen numbers of the first reflectors rp and rq are each provided in the scintillation counter crystal layer 2B.

Figure 9:
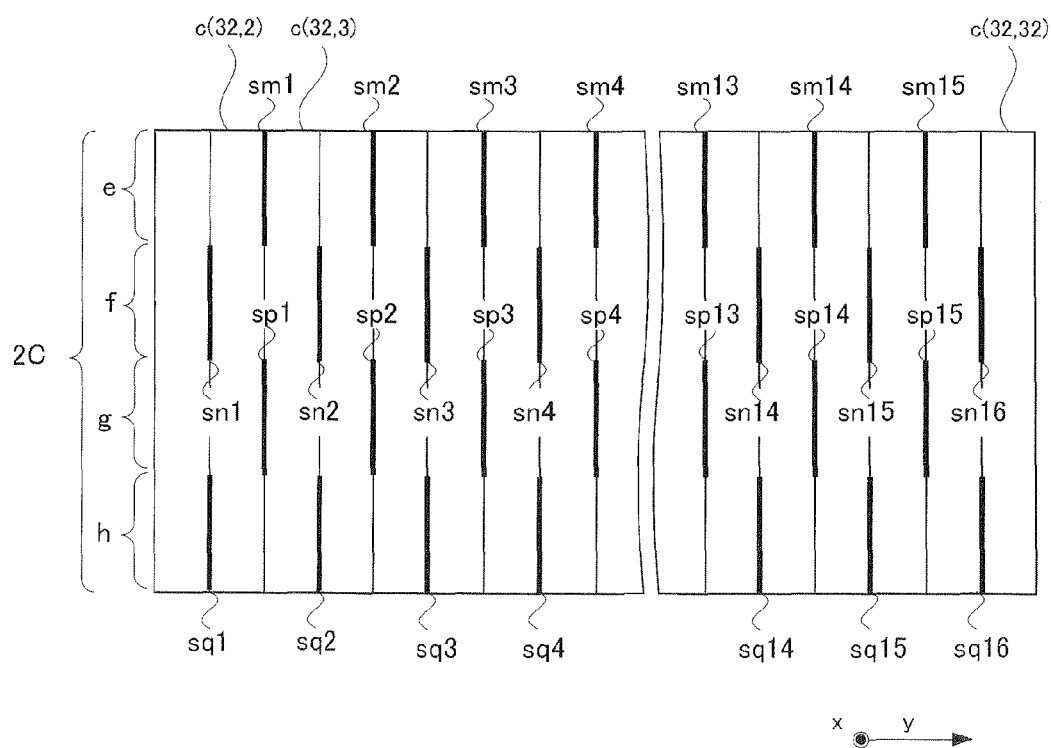
FIG. 9 is a plan view of the scintillator according to Embodiment 2 seen from yz-side end face thereof.

Next, description will be given to the yz-side end face having the scintillator according to Embodiment 2. FIG. 9 is a plan view of the scintillator according to Embodiment 1 when seen from the yz-side end face thereof. As shown in FIG. 9, any second reflector s is plate-like and extends in the x-direction and z-direction. The second reflector s is inserted in the gap between the scintillation counter crystals in the scintillation counter crystal layer 2C. The height thereof in the z-direction is set, for example, at 9 mm.

In the scintillation counter crystal layer 2C, a second reflector sm is inserted in the first region e, and a second reflector sn is inserted in the second region f. The second reflector sm1 is inserted between, for example, a (32, 2) and a (32, 3) among thirty-two numbers of the scintillation counter crystals arranged in the y-direction. Thus, scintillation counter crystals of even numbers are arranged in the y-direction on a left hand of the second reflectors sm, and scintillation counter crystals of odd numbers in the y-direction on a right hand of the second reflectors sm. On the other hand, the second reflector sn is inserted in a position in the scintillation counter crystal layer different from that where the second reflector sm is inserted. Specifically, scintillation counter crystals of odd numbers are arranged in the y-direction on a left hand of the second reflectors sn, and scintillation counter crystals of even numbers in the y-direction on a right hand of the second reflectors sn. Here, fifteen numbers of the second reflector sm are provided in the scintillation counter crystal layer 2A, and sixteen numbers of the second reflector sn are provided in the scintillation counter crystal layer 2C.

Likewise, in the scintillation counter crystal layer 2C, a second reflector sp is inserted in the third region g, and a second reflector sq is inserted in the fourth region h between the gaps of the scintillation counter crystals. The second reflector frame sp in the third region g has the same inserting position as the second reflector sp in the first region e. Moreover, the second reflector frame sp in the fourth region h has the same inserting position as the second reflector sp in the second region f. Specifically, scintillation counter crystals of even numbers are arranged in the y-direction on a left hand of the second reflectors sp, and scintillation counter crystals of odd numbers in the y-direction on a right hand of the second reflectors sp. And scintillation counter crystals of odd numbers are arranged in the y-direction on a left hand of the second reflectors sp, and scintillation counter crystals of even numbers in the y-direction on a right hand of the second reflectors sp. Here, fifteen numbers of the second reflector sp are provided in the scintillation counter crystal layer 2B, and sixteen numbers of the second reflector sq are provided in the scintillation counter crystal layer 2C.

Other constructions in the radiation detector 40 according to Embodiment 2 are in accordance with the constructions noted in Embodiment 1.

With the constructions of Embodiment 1 and Embodiment 2, the PMT 3 detects fluorescence emitted from the scintillator 2 rapidly. Here, in order to clarify this effect, description will next be given to detection of fluorescence in the radiation detector according to Embodiment 1 and Embodiment 2.

When the scintillator 2 emits fluorescence, the PMT 3 detects it. The scintillator 2 with four scintillation counter crystal layers according to the conventional constructions has variations in speed where fluorescence reaches the PMT 3. Particularly, the scintillation counter crystal layer 52A as a scintillation counter crystal layer furthest away from the PMT 3 has large variations in incident fluorescence (see FIG. 15.) Fluorescence emitted in the scintillation counter crystal layer 52A cannot reach the PMT 3 without passing through the other scintillation counter crystal layers 52B, 52C, and 52D. Meanwhile, the fluorescence need to pass through the transparent material t that connects each of the scintillation counter crystal layers. The scintillation counter crystal layer has extremely high effective atomic number for detecting gamma rays. However, the transparent material t need to connect each of the scintillation counter crystals, and thus need to have adhesive properties. Thus, an adhesive resin is typically selected as the transparent material t. Consequently, the transparent material t greatly differs from scintillation counter crystal layer in effective atomic number and optical properties. Therefore, it is difficult to make the transparent material t have the same refractive index as the scintillation counter crystal layer. Where the refractive index differs between the scintillation counter crystal layer and the transparent material t, a traveling path of fluorescence that passes through the scintillation counter crystal layer and the transparent material t toward the PMT 3 is to be complicated in conjunction with influences of the foregoing reflection. With the complicated traveling path of fluorescence, a part of fluorescence hardly reflects, and thus reaches the PMT 3 rapidly. On the other hand, a part of fluorescence is delayed in reaching the PMT3 due to the complicated path. That is, fluorescence emitted in the scintillator 2 enters into the PMT 3 with temporal evolution as frequencies of reflection and refraction increase.

Figure 10:
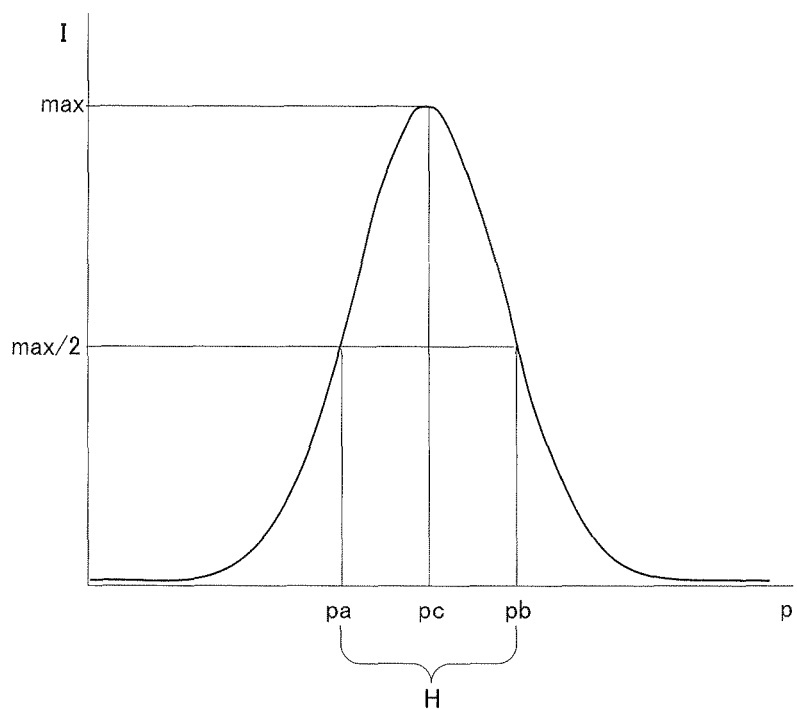
FIG. 10 is an explanatory view showing a full width at half maximum according to Embodiment 2.

Fluorescence with such temporal evolution may be expressed as fluorescence with reduced time resolution. For explanation of reduction in the time resolution, a full width at half maximum is to be introduced as an index of time resolution. Description will be made to the full width at half maximum. FIG. 10 is an explanatory view showing the full width at half maximum according to Embodiment 2. Radiation detector 40 detects fluorescence with temporal evolution. Here, time intensity distribution function of fluorescence is a function on fluorescence intensity I and time, and shows temporal evolution of fluorescence. Specifically, FIG. 10 schematically shows a spatial intensity distribution function of fluorescence, where let P be time, and I be fluorescence intensity related therewith. That is, fluorescence is spread having a predetermined distribution with respect to time P. Specifically, fluorescence intensity I is of maximum max at time pc. Fluorescence intensity I decreases monotonously as time leaves from pc.

A full width at half maximum is an index of spread of fluorescence intensity I that forms fluorescence with respect to time p. Specifically, firstly determine max/2, which is a half value of maximum max of fluorescence intensity I in the spatial intensity distribution function of fluorescence. Subsequently, read time pa and pb corresponding to max/2 in the spatial intensity distribution function of fluorescence, and assume a temporal width H between a time pa and a time pb is a full width at half maximum. That is, with determination of the full width at half maximum, time resolution of the radiation detector may be compared.

Next, results of examinations will be described showing that the constructions of Embodiment 1 and Embodiment 2 may surely discriminate from which region of the first region e, the second region f, the third region g, and the fourth region h fluorescence detected by the PMT 3 is derived. Specifically, five types of scintillators with different constructions from one another are to be prepared including one corresponding to the conventional construction for comparison and contrast. States will be described where they perform position discrimination of the scintillator.

In a first construction, a single reflector frame is provided in a single scintillation counter crystal layer, as shown in FIG. 11(*a*). Reflectors that form the reflector frame are provided in all the four sides forming the scintillation counter crystal layer. Fluorescence generated in a scintillation counter crystal is reflected by the reflectors without traveling toward an adjacent scintillation counter crystal, and then travels toward the PMT 3. Thus, with the first construction, fluorescence travels toward the PMT 3 in the simplest path. However, position of the scintillation counter crystal in the z-direction cannot be discriminated.

In a second construction, every one reflector frame are provided in each of the two scintillation counter crystal layers, as shown in FIG. 11(*b*). This construction is equivalent to the conventional construction, since the scintillation counter crystal layer and the reflector frame correspond to one to one. The scintillator has two reflector frames. The reflector frames are, for example, provided in the upper scintillation counter crystal layer as in FIG. 6(*a*), and in the lower scintillation counter crystal layer as in FIG. 6(*b*). That is, the reflector frames are inserted in the same manner as those in the scintillation counter crystal layer 2A in Embodiment 1. The scintillation counter crystal layer and the reflector frame, however, correspond to one to one, which differs from the scintillation counter crystal layer 2A in Embodiment 1 having two reflector frames. The second construction with such configuration may realize discrimination of generating positions of fluorescence in the z-direction. That is, the positions where fluorescence is generated is discriminated between the upper scintillation counter crystal layer and the lower scintillation counter crystal layer.

Figure 15:
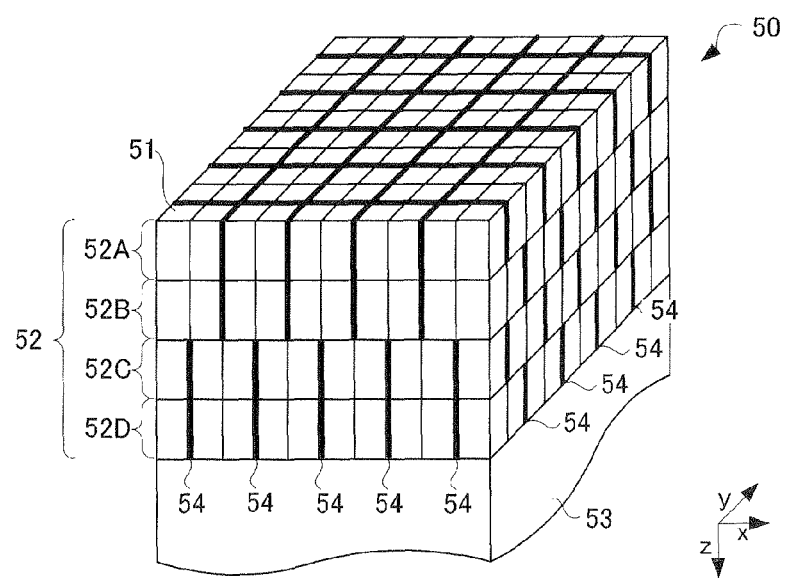
FIG. 15 is a perspective view showing a construction of a conventional radiation detector.

In a third construction, every one reflector frame is provided in each of the four scintillation counter crystal layers. This construction is equivalent to the conventional construction since the scintillation counter crystal layer and the reflector frame correspond to one to one. The scintillator has two reflector frames. That is, the reflector frames are inserted in the same manner as those in combination of the scintillation counter crystal layer 2A and the scintillation counter crystal layer 2B in Embodiment 1. The scintillation counter crystal layer and the reflector frame, however, correspond to one to one, which differs from the scintillation counter crystal layer 2A the scintillation counter crystal layer 2B in Embodiment 1 each having two reflector frames. The third construction may realize discrimination of generating positions of fluorescence in each of the scintillation counter crystal layers. The outline of the construction is as shown in FIG. 15.

A fourth construction corresponds to the construction described in Embodiment 1, and has two scintillation counter crystal layers and four reflector frames (see FIG. 1.) A fifth construction corresponds to the construction described in Embodiment 2, and has one scintillation counter crystal layer and four reflector frames (see FIG. 7.) Here, a height of the scintillator in the z-direction is equal in each construction for uniform measurement conditions.

Results as in FIG. 12 have been obtained by irradiating an incident surface of each scintillator with gamma rays from a $^{22}$Na point source and by mapping detection intensity of fluorescence obtained at this time. Here, (a) to (e) in FIG. 12 are mappings of intensity of fluorescence detected by the PMT 3 that show regions for four selected scintillation counter crystals. FIG. 12(*a*) shows the results according to the first construction illustrated in FIG. 11(*a*). According to the first construction, fluorescence that each scintillation counter crystal emitted appears as four dots. That is, discrimination is performed of fluorescence that each scintillation counter crystal emitted. Schematically illustration thereof is FIG. 12(f). That is, all four dots are derived from a first scintillation counter crystal layer.

FIG. 12(b) shows the results according to the second construction illustrated in FIG. 11(b). According to the second construction, fluorescence that each scintillation counter crystal emitted appears as eight dots. Specifically, the upper scintillation counter crystal layer and the lower scintillation counter crystal layer vary from each other in spread of fluorescence. Consequently, discrimination may be performed whether fluorescence is generated in the upper or lower scintillation counter crystal layer. Schematically illustration thereof is FIG. 12(g). That is, four dots of the eight dots are derived from the first scintillation counter crystal layer, and four dots are derived from the second scintillation counter crystal layer.

FIG. 12(c) shows the results according to the third construction illustrated in FIG. 15. According to the third construction, fluorescence that each scintillation counter crystal emitted appears as sixteen dots. Specifically, each of the scintillation counter crystal layers varies from each other in spread of fluorescence. Consequently, discrimination may be performed in which scintillation counter crystal layer fluorescence is generated. Schematically illustration thereof is FIG. 12(h). That is, four dots of the sixteen dots are derived from the first scintillation counter crystal layer, and four dots are derived from the second scintillation counter crystal layer. Moreover, four dots are derived from the third scintillation counter crystal layer, and four dots are derived from the fourth scintillation counter crystal layer.

In addition, FIG. 12(d) shows the results according to the fourth construction (construction of Embodiment 1) illustrated in FIG. 1. The construction of Embodiment 1 has four reflector frames with different inserting positions. Thus, when discrimination may be performed in which regions e, f, g, and h fluorescence is generated, fluorescence should appear as sixteen dots as shown in FIG. 12(c). In this regard, sixteen dots appear, as is apparent from FIG. 12(d). That is, with the fourth construction, discrimination may be performed in which divided four regions e, f, g, and h fluorescence is generated.

Moreover, FIG. 12(e) shows the results according to the fifth construction (construction of Embodiment 2) illustrated in FIG. 7. In this regard, sixteen dots also appear as is similar to FIG. 12(c). That is, with the fifth construction, discrimination may also be performed in which divided four regions e, f, g, and h fluorescence is generated.

As is apparent from FIG. 12, with the constructions of Embodiment 1 and Embodiment 2, discrimination may also be performed in which divided four regions e, f, g, and h fluorescence is generated (as for each region, see FIGS. 1 and 7.)

Embodiment 3

Figure 13:
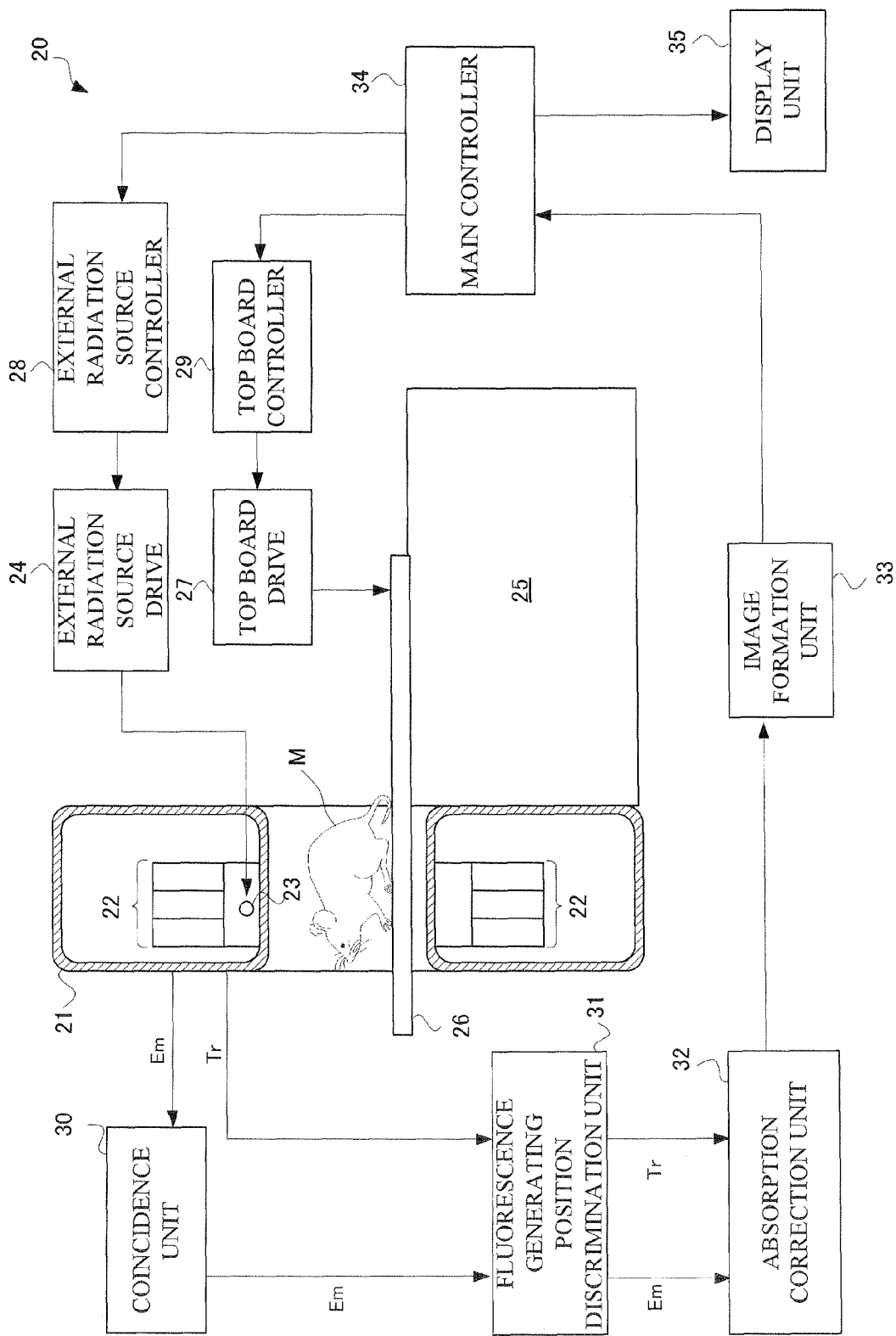
FIG. 13 is a functional block diagram showing a construction of a PET device according to Embodiment 3.

Next, description will be given to tomography equipment (hereinafter referred to as a PET device) provided with the radiation detector described in Embodiment 1 and Embodiment 2. FIG. 13 is a functional block diagram showing a construction of a PET device according to Embodiment 3. As shown in FIG. 13, the PET device 20 according to Embodiment 3 includes a gantry 21, a detector ring 22 provided inside the gantry 21, a gamma-ray point source 23 as an external radiation source provided on an inner surface side of the detector ring 22 for applying fan beams of gamma rays and an external radiation source drive 24 for driving thereof, a bed 25 provided with a top board 26 to mount small animals such as a mouse (hereinafter referred to as a subject M), and a top board drive 27 to slide the top board 26. Here, the external radiation source drive 24 is controlled under an external radiation source controller 28. The top board drive 27 is controlled under a top board controller 29. The PET device 10 further includes each unit for obtaining sectional images of the subject M. Specifically, the PET device 20 includes a coincidence unit 30 to receive gamma ray detection signals showing a detection position, detection strength, and detection time of gamma rays from the detector ring 22 for performing coincidence of an annihilation gamma ray-pair, a fluorescence generating position discrimination unit 31 to discriminate an incident position of gamma rays in the detector ring 22 based on two pieces of gamma ray detection data determined to be an annihilation-gamma-rays pair in the coincidence unit 30, an absorption correction unit 32 to perform absorption correction of gamma rays with reference to transmission data mentioned later, and an image formation unit 33 to form a PET image of the subject M.

The PET device 20 according to Embodiment 3 further includes a main controller 34 to control each of the controllers 28 and 29 en bloc, and a display unit 35 to display the PET image. The main controller 34 is formed of a CPU. Here, the CPU performs execution of various programs to realize each of the controllers 28 and 29 and coincidence unit 30, the fluorescence generating position discrimination unit 31, the absorption correction unit 32, and the image formation unit 33. Here, the coincidence unit 30, the fluorescence generating position discrimination unit 31, and the image formation unit 33 correspond to the coincidence device, the fluorescence generating position discrimination device, and the image formation device, respectively, in this invention.

Description will be given to operations of the PET device according to Embodiment 3 with reference to FIG. 13. Upon conducting of examinations with the PET device 20 according to Embodiment 3, firstly the subject M is laid on the top board 26 with radiopharmaceutical being administered thereto by injection in advance. Next, the top board 26 slides to bring the subject M into the gantry 21, and thereafter transmission data showing absorption distributions of gamma rays within the subject M is obtained. Specifically, beams of gamma rays in a fan shape are applied from the gamma-ray point source 23 towards the subject M. The gamma ray beams will pass through the subject M to be detected with the detector ring 22. Such detection is performed throughout the periphery of the subject M while rotating the gamma-ray point source 23 along the inner surface of the detector ring 22, whereby an absorption map of gamma rays in the section of the subject M is obtained. Then, the top board 26 slides again to repeat obtaining of the above gamma ray absorption-coefficient map at every change of a position of the subject M sequentially. As noted above, the gamma ray absorption coefficient map on the entire subject M is to be obtained.

Following obtaining of the transmission data as mentioned above, emission data is obtained to detect the annihilation-gamma-rays pair that is emitted from the radiopharmaceutical administered to the subject M. Prior to this, the gamma-ray point source 23 obstructive of obtaining the emission data is moved in a direction of the body axis of the subject M for storage thereof into a radiation source screen unit not shown.

Thereafter, emission data is obtained. Specifically, the detector ring 22 detects an annihilation gamma-rays pair that is emitted from the inside of the subject M having traveling directions opposite by 180 degrees. Gamma-ray detection signals detected with the detector ring 22 are sent to the coincidence unit 30. It is considered as one count only when two gamma ray photons are detected simultaneously in positions different to each other in the detector ring 22, and then subsequent data processing may be performed. Thereafter, the top board 26 slides to repeat obtaining of the emission data while changing positions of the subject M sequentially, thereby obtaining emission data with sufficient number of counts for imaging localization of the radiopharmaceutical inside the subject M. Finally, the top board 26 slides again to move the subject M away from the inside of the gantry 21. An examination is to be completed.

Next, description will be given to data processing in the PET device according to Embodiment 3 with reference to FIG. 13. Transmission detection data Tr and emission detection data Em outputted from the detector ring 22 are sent to the fluorescence generating position discrimination unit 31 to identify which scintillation counter crystal has detected the data. Detection data sent from the multi-anode type PMT 3 includes information on fluorescence intensity distributions that the PMT 3 detected, and the fluorescence generating position discrimination unit 31 calculates a center of gravity of fluorescence from the data. Consequently, the fluorescence position is discriminated in x-, y-, and z-directions in FIG. 1. The procedure has been described in Embodiment 1 (see FIG. 6.)

As mentioned above, transmission detection data and emission detection data including incident positions of gamma rays are formed and sent to the subsequent absorption correction unit 32. Here, the transmission detection data Tr and the emission detection data Em correspond to the radiation detection data in this invention.

The absorption correction unit 32 performs absorption corrections to the emission detection data Em for eliminating influences of the gamma ray absorption distributions in the subject M that overlaps with the emission detection data Em while referring to the transmission detection data Tr noted above. Thus, detection data showing radiopharmaceutical distributions in the subject M with more accuracy is sent to the image formation unit 33, and then a PET image is to be reconstructed. Finally, the display unit 35 displays the PET image.

With the foregoing construction, the PET device 20 may be provided having significantly suppressed manufacturing costs without reducing spatial resolution and detection sensitivity. There are fewer scintillation counter crystals in number that form the scintillator 2 in Embodiment 3, but the spatial resolution and detection sensitivity thereof will not be reduced accordingly. Considering fewer scintillation counter crystals in number that form the PET device 20, the PET device 20 of low cost may be provided.

Figure 14:
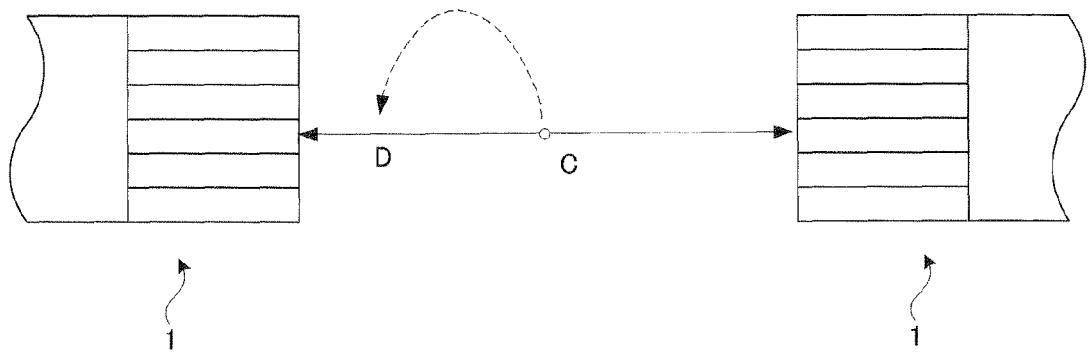
FIG. 14 is an explanatory schematic view of improvement in time resolution according to Embodiment 3.

With the foregoing construction, the PET device 20 may also be provided having improved spatial resolution due to different reasons from the above. The radiation detector according to Embodiment 1 and Embodiment 2 has high time resolution. In fact, when the radiation detector having high time resolution is used in the PET device 20, spatial resolution increases accordingly. Two different radiation detectors detect an annihilation gamma-ray pair. When having low time resolution, the two radiation detectors have difficulties in coincidental detection of the annihilation-gamma-rays pair, which may cause reduced spatial resolution. That is, as shown in FIG. 14, the annihilation gamma-ray pair is generated in an intermediate point C between the two radiation detectors, and is to be detected with each of the two radiation detectors. In theory, the two radiation detectors are to send to the coincidence unit 30 that the annihilation gamma rays have been detected simultaneously. However, with radiation detectors having low time resolution, it is no longer considered that the coincidental detection was performed. Thus, the radiation detector that detected the annihilation gamma rays earlier, and the radiation detector detected them later are to exist apparently. Then, the annihilation gamma rays are generated in practice in the intermediate point C between both of the radiation detectors, however, the annihilation gamma-ray pair is to be mistaken for that generated in a region D close to the radiation detector detected it earlier. An actual generating position of the annihilation gamma rays cannot be determined under the influence of such mistake, which may lead to reduced spatial resolution. In this way, there is a close relationship between time resolution and spatial resolution. Specifically, spatial resolution of the PET device 20 increases as time resolution of the radiation detector increases. Considering that the radiation detector of Embodiment 1 and Embodiment 2 has improved time resolution, the PET device 20 of Embodiment 3 has high spatial resolution.

Finally, effects of the radiation detector in this invention are to be emphasized with reference to a table. Table 1 shows comparisons on energy resolution, time resolution, a number of discriminative regions, and manufacturing costs where the foregoing construction 1 to construction 5 are selected as the radiation detector provided in the PET device 20.

TABLE 1

|  | ENERGY RESOLUTION | TIME RESOLUTION | NUMBER OF DISCRIMINATIVE REGION | MANUFACTURING COST |
| --- | --- | --- | --- | --- |
| CONSTRUCTION 1 | 11.1% | 450 ps | 1 | 48,000,000 yen |
| CONSTRUCTION 2 | 12.0% | 455 ps | 2 | 57,000,000 yen |
| CONSTRUCTION 3 | 13.0% | 476 ps | 4 | 83,000,000 yen |
| CONSTRUCTION 4 | 11.2% | 455 ps | 4 | 48,000,000 yen |
| CONSTRUCTION 5 | 11.6% | 445 ps | 4 | 57,000,000 yen |

Description will be given to each parameter in the table. Energy resolution is an index of discriminative capability on energy intensity of incident radiation. When this value is low, radiation is considered to have high energy. Time resolution shows measurement accuracy of time when radiation entered. When this value is low, the PET device 20 is entirely considered to have good spatial resolution. A number of discriminative regions shows discriminative capability of the fluorescence in the z-direction in each construction. For instance, the construction 4 as Embodiment 1 may discriminate from which of regions e, f, g, and f fluorescence has been emitted. Thus, the number of discriminative regions is to be four. When this value is high, the PET device 20 is considered to have high spatial resolution. Manufacturing cost is a cost per one set of the PET device 20.

The construction 3 according to the conventional configuration has a larger number of discriminative regions than the construction 1 and construction 2. However, energy resolution, time resolution, and manufacturing cost increase accordingly. That is because device configuration has been complicated and a path of fluorescence toward the PMT 3 has been complicated.

Here, the constructions 4 and 5 according to this invention has energy resolution, time resolution, and manufacturing cost similar to those in the constructions 1 and 2, but has a larger number of discriminative regions. In other words, according to this invention, the PET device 20 may be produced having low manufacturing cost as well as suitable energy resolution, time resolution, and manufacturing cost.

This invention is not limited to each of the foregoing embodiments, but may be modified as follows.

(1) The first reflector frame 7 to the fourth reflector frame 10 in each of the foregoing embodiments are arranged, in order of numeral numbers, toward the PMT 3. The order thereof is not particularly limited. That is, each of the four regions in the scintillator 2 may just correspond to any of each reflector frames 7, 8, 9, and 10.

(2) In each of the foregoing embodiments, radiation corresponds to gamma rays. This invention may for example be adapted for a detector to detect X-rays.

(3) In each of the foregoing embodiments, the scintillation counter crystal is composed of LYSO. Another materials, such as GSO ($Gd_2SiO_5$), may be used in this invention. According to this modification, a radiation detector of low price and a PET device provided therewith may be provided. The scintillation counter crystal layers may be configured so as to have different materials of the scintillation counter crystals.

(4) In each of the foregoing embodiments, the scintillator 2 has two scintillation counter crystal layers. This invention is not limited to this, but may be of construction having increased scintillation counter crystal layers in total number. For instance, it may be formed of four scintillation counter crystal layers. In this case, two layers close to the PMT 3 are for example formed of GSO, and two layers away from the PMT 3 are for example formed of LYSO. GSO differs from LYSO in its fluorescence decay time constant. Therefore, a construction with four scintillation counter crystal layers may realize position discrimination of fluorescence in the z-direction. Here, in the modification of this invention, eight reflector frames are provided. Moreover, when the construction of Embodiment 2 is applied to this modification, the scintillator 2 may have two layers of the scintillation counter crystal layer formed of GSO and the scintillation counter crystal layer formed of LYSO. In addition, the constructions of Embodiment 1 and Embodiment 2 may be replaced with GSO and LYSO to form a scintillator having three scintillation counter crystal layers.

(5) In each of the foregoing embodiments, the fluorescence detection device is formed of the photomultiplier tube. In this invention, it is also possible to use for example a photodiode and an avalanche photodiode instead of the photomultiplier tube.

(6) The construction of each foregoing embodiment is not limited to the PET. For instance, it may be adapted for an SPECT device. It is also applicable to a device, such as PET-CT, that uses both of gamma rays and X-rays for determination. The construction of Embodiment 1 is not limitedly applied to research fields, but may be applied to a nondestructive inspection system of industrial use. It may also be adapted for medical fields.

(7) The construction of Embodiment 3 is for small animals. Configurations of the detector ring of Embodiment 3 may be modified optionally. Consequently, this invention is also applicable to a PET device having a gantry of large bore.

INDUSTRIAL UTILITY

As described above, this invention is suitable for a radiation detector for use in research, medical or industrial fields.

The invention claimed is:

1. A radiation detector comprising a scintillator formed of two or more scintillation counter crystals to convert radiation emitted from a radiation source into fluorescence, and a fluorescence detection device to detect fluorescence from the scintillator, the radiation detector comprising a first reflector frame in which two or more first reflectors that extend along a first direction while being arranged in a second direction perpendicular to the first direction and two or more second reflectors that extend along the second direction while being arranged in the first direction are arranged in a lattice pattern, and a second reflector frame having two or more reflectors arranged in a lattice pattern as well as the first reflector frame, the first reflector frame and the second reflector frame being laminated along a third direction that is perpendicular to the first direction and the second direction, each of the scintillation counter crystals being inserted in the third direction through the first reflector frame and the second reflector frame, whereby two or more scintillation counter crystals are arranged in the first direction and the second direction to form a first scintillation counter crystal layer, and a position of the first reflector frame provided in the first scintillation counter crystal layer differing from a position of the second reflector frame provided in the first scintillation counter crystal layer.

2. The radiation detector according to claim 1, wherein the scintillator further comprises a second scintillation counter crystal layer composed of two or more scintillation counter crystals in an interposed position between the first scintillation counter crystal layer and the fluorescence detection device, the second scintillation counter crystal layer comprises a third reflector frame having two or more reflectors arranged in a lattice pattern as well as the first reflector frame, and a fourth reflector frame having two or more reflectors arranged in a lattice pattern as well as the third reflector frame, the third reflector frame and the fourth reflector frame are laminated along a third direction that is perpendicular to the first direction and the second direction, each of the scintillation counter crystals is inserted in the third direction through the third reflector frame and the fourth reflector frame, whereby two or more scintillation counter crystals are arranged in the first direction and the second direction to form a second scintillation counter crystal layer, and a position of the third reflector frame provided in the second scintillation counter crystal layer differs from a position of the fourth reflector frame provided in the second scintillation counter crystal layer.

3. The radiation detector according to claim 2, wherein the third reflector frame and the fourth reflector frames are formed of two or more first reflectors and two or more second reflectors, respectively, each of the first reflectors and the second reflectors has two or more grooves formed along the third direction, and the grooves each provided in the first reflectors and the second reflectors are fitted to form the third reflector frame and the fourth reflector frame.

4. The radiation detector according to claim 2, wherein the third reflector frame and the fourth reflector frames are formed of two or more first reflectors and two or more second reflectors, respectively, each of the first reflectors and the second reflectors has two or more grooves formed along the third direction, and the grooves each provided in the first reflectors and the second reflectors are fitted to form the third reflector frame and the fourth reflector frame.

5. The radiation detector according to claim 1, wherein the first reflector frame and the second reflector frames are formed of two or more first reflectors and two or more second reflectors, respectively, each of the first reflectors and the second reflectors has two or more grooves formed along the third direction, and the grooves each provided in the first reflectors and the second reflectors are fitted to form the first reflector frame and the second reflector frame.

6. The radiation detector according to claim 1, wherein a transparent material is provided that allows fluorescence to pass through so as to surround each of the scintillation counter crystals that form the scintillator.

7. The radiation detector according to claim 1, wherein four scintillation counter crystals are inserted in each of sections divided by a reflector lattice of the reflector frame provided in the scintillator.

8. Tomography equipment comprising as detector ring to generate radiation detection data with the radiation detector according to claim 1 that is arranged in a ring, shape;
a coincidence device to perform coincidence of the radiation detector data; a fluorescence generating position discrimination device to discriminate a position of generating fluorescence in the detector ring; and
an image formation device to receive analytical data sent from the fluorescence generating position discrimination device to form a sectional image of a subject.

9. A radiation detector comprising a scintillator formed of two or more scintillation counter crystals to convert radiation emitted from a radiation source into fluorescence, and a fluorescence detection device to detect fluorescence from the scintillator,
the radiation detector comprising a first reflector frame in which two or more first reflectors that extend along a first direction while being arranged in a second direction perpendicular to the first direction and two or more second reflectors that extend along the second direction while being arranged in the first direction are arranged in a lattice pattern, and a second reflector frame, a third reflector frame, and a fourth reflector frame each having two or more reflectors arranged in a lattice pattern as well as the first reflector frame, the first reflector frame, the second reflector frame, the third reflector frame, and the fourth reflector frame being laminated along a third direction perpendicular to the first direction and the second direction, each of the scintillation counter crystals is inserted in the third direction through the first reflector frame, the second reflector frame, the third reflector frame, and the fourth reflector frame, whereby two or more scintillation counter crystals are arranged in the first direction and the second direction to form a scintillation counter crystal layer, and an inserting position in the scintillation counter crystal layer differing from one another in the first reflector frame, the second reflector frame, the third reflector frame, and the fourth reflector frame.

10. The radiation detector according to claim 9, wherein the first reflector frame and the second reflector frames are formed of two or more first reflectors and two or more second reflectors, respectively, each of the first reflectors and the second reflectors has two or more grooves formed along the third direction, and the grooves each provided in the first reflectors and the second reflectors are fitted to form the first reflector frame and the second reflector frame.

11. The radiation detector according to claim 9, wherein a transparent material is provided that allows fluorescence to pass through so as to surround each of the scintillation counter crystals that form the scintillator.

12. The radiation detector according to claim 9, wherein four scintillation counter crystals are inserted in each of sections divided by a reflector lattice of the reflector frame provided in the scintillator.

13. Tomography equipment comprising a detector ring to generate radiation detection data with the radiation detector according to claim 9 that is arranged in a ring shape;
a coincidence device to perform coincidence of the radiation detector data; a fluorescence generating position discrimination device to discriminate a position of generating fluorescence in the detector ring; and
an image formation device to receive analytical data sent from the fluorescence generating position discrimination device to than a sectional image of a subject.

* * * * *